(12) United States Patent  
Bong

(10) Patent No.: US 6,377,265 B1
(45) Date of Patent: Apr. 23, 2002

(54) DIGITAL DIFFERENTIAL ANALYZER

(75) Inventor: William Hock Soon Bong, Singapore (SG)

(73) Assignee: Creative Technology, Ltd., Singapore (SG)

( * ) Notice: Subject to any disclaimer, the term of this patent is extended or adjusted under 35 U.S.C. 154(b) by 0 days.

(21) Appl. No.: 09/248,779

(22) Filed: Feb. 12, 1999

(51) Int. Cl.$^7$ .............................................. G06F 15/80
(52) U.S. Cl. ...................................... 345/505; 345/561
(58) Field of Search ................................ 345/501, 502, 345/506, 505, 561, 563, 530, 536–538, 418, 441–443

(56) References Cited

U.S. PATENT DOCUMENTS

| | | | | |
|---|---|---|---|---|
| 3,670,154 A | * | 6/1972 | McMurray | 708/102 |
| 3,693,064 A | | 9/1972 | Kiwiet | 318/571 |
| 3,751,712 A | | 8/1973 | Murray | 315/24 |
| 3,757,095 A | | 9/1973 | Kiwiet | 235/151.11 |
| 3,805,138 A | | 4/1974 | Hilker | 318/696 |
| 3,916,175 A | | 10/1975 | Lauer et al. | 235/152 |
| 4,365,309 A | * | 12/1982 | Noguchi et al. | 708/102 |
| 4,405,985 A | | 9/1983 | Hall et al. | 364/423 |
| 4,956,722 A | * | 9/1990 | Hamada | 358/444 |
| 5,303,321 A | * | 4/1994 | Peaslee et al. | 345/443 |
| 5,329,283 A | | 7/1994 | Smith | 342/25 |
| 5,440,682 A | * | 8/1995 | Deering | 345/503 |
| 5,533,170 A | | 7/1996 | Teitzel et al. | 395/108 |
| 5,566,279 A | * | 10/1996 | Katayama | 345/419 |
| 5,594,854 A | | 1/1997 | Baldwin et al. | 395/141 |
| 6,088,037 A | * | 7/2000 | Fukunaga et al. | 345/431 |
| 6,184,903 B1 | * | 2/2001 | Omori | 345/505 |

OTHER PUBLICATIONS

John L. Hennessy et al., Computer Architecture: A Quantitative Approach, pp. 199–214 and pp. 251–278, Morgan Kaufman Publishers, Inc. 1990.
Peter M. Kogge, "The Architecture of Pipelined Computers", pp. 71–80, Hemisphere Publishing, 1981.
James D. Foley et al., Computer Graphics: Principles and Practice, 2nd ed., pp. 72–81, Addision–Wesley 1992
Renate Kempf and Chris Frazier, OpenGL Architecture Review Board, "OpenGL Reference Manual" 2nd ed., The Official Reference Document to OpenGL, Version 1.1, Addision Wesley, 1997.

* cited by examiner

*Primary Examiner*—Kee M. Tung
(74) *Attorney, Agent, or Firm*—Townsend and Townsend and Crew, LLP

(57) ABSTRACT

A digital differential analyzer (DDA) with parallel processing paths. The parallel processing paths can be provided through the use of a pipeline in which some of the input data registers are implemented with double buffers. Each double buffer includes an external register that corresponds to a setup path and an internal register that corresponds to a render path. While the rendering phase is being performed for the current primitive using the internal registers, the setup phase for the next primitive can be performed and the external registers can be updated. The two paths are synchronized with a prepare-to-render message. The DDA can include multiple arithmetic units to allow concurrent processing of multiple fragments of an object. The elements within the DDA (e.g., the internal registers, multiplexers, output registers, and so on) can be configured to provide more efficient implementations of scan conversion and sub-pixel correction than those of conventional DDAs.

23 Claims, 15 Drawing Sheets

DIGITAL DIFFERENTIAL ANALYZER

BACKGROUND OF THE INVENTION

This invention relates to computer graphics, and in particular to a digital differential analyzer (DDA) with parallel processing paths for rendering images.

Conventional computer systems manipulate graphical objects as high-level entities. Such graphical objects can be represented using a collection of graphical shapes such as lines, triangles, trapezoids, and other polygons. The shapes can be defined using a collection of end points having two-dimensional (2-D) or three-dimensional (3-D) coordinates. This high-level description simplifies the definition and storage of graphical objects.

To display the graphical objects, the high-level description is transformed into a low-level description suitable for display on, for example, a CRT. This transformation process is generally referred to as "rendering." The rendering process typically includes the decomposition of a high-level entity (or a graphical object) into a set of graphical primitives (e.g., lines and triangles) for further processing. Each primitive is decomposed into a series of fragments, with each fragment being a part of a primitive. Each fragment is further decomposed into a set of picture elements (or pixels) that can be displayed on the CRT. A fragment may, however, cover only part of a pixel. A more detailed description of the rendering process is provided in U.S. Pat. No. 5,594,854 entitled "GRAPHICS SUBSYSTEM WITH COARSE SUBPIXEL CORRECTION", issued Jan. 14, 1997 (hereinafter, the '854 patent), and incorporated herein by reference. The rendering process is also described below.

The display of graphical objects typically requires intensive mathematical computation. For zooming or rotation, the objects in the image space are continually re-rendered. For 3-D graphics., the computational requirement is especially acute because of the additional computations required to transform a 3-D object into a 2-D image. Furthermore, the demand to produce more fully rendered 3-D images is even greater due to a higher user expectation for realism. Even with these intensive computational requirements, the rendering process needs to be performed in an expedient manner since slow rendering can cause the display of objects (i.e., during zooming or rotation) to appear unacceptably jerky. Thus, efficient rendering is essential in transforming graphical objects into high quality images.

To expedite the rendering process, a digital differential analyzer (DDA) is typically used to perform arithmetic computations. The DDA can be used, for example, to produce linear gradation (i.e., linear interpolation) of color, intensity, and other graphical information over an image area. For a primitive (e.g., polygon, triangle, or line), the DDA incrementally interpolates intermediate parameter values (e.g., shading values) at corresponding centers of pixels based on a start parameter value at a particular vertex and gradients of the parameter.

The operation of the DDA can usually be decomposed into three phases: (1) setup, (2) prepare-to-render, and (3) render. For conventional DDAs, these phases occur sequentially. Furthermore, the rendering process is typically performed and completed for a particular primitive before the next primitive is rendered.

The setup phase includes operations necessary to prepare the DDA. Typically, the DDA includes a set of registers that contain, for example, the start value and the gradient values. These values are typically loaded into the registers during the setup phase for each primitive being rendered. The prepare-to-render phase can be as simple as receiving a message to start the rendering process. Upon receiving the message, the render phase commences and the DDA renders the primitive.

The setup phase is an overhead of the rendering process and results in inefficiencies in the operation of the DDA. Ideally, the setup phase should consume no additional clock cycles. However, this is generally not true for conventional DDAs. Thus, the setup "cost" is normally amortized over the total number of clock cycles required to render a primitive.

A computer graphics system usually includes multiple DDAs, with each DDA assigned to a particular task. For example, a set of DDAs (e.g., one for each of the red, green, and blue colors) may be used to produce linear gradation of color over an image area. An additional DDA may be used to interpolate depth for a primitive of a 3-D object, to determine which portions of the primitive are actually visible from a synthetic camera's point of view (i.e., visible surface determination).

To increase throughput in the rendering process, the DDAs in a computer graphics system can be operated in a pipeline structure. Pipelining is an implementation technique that improves throughput by overlapping the execution of multiple instructions. A pipelined graphics system is discussed in the aforementioned U.S. Pat. No. 5,594,854. However, the '854 patent discusses pipelining at the subsystem level (i.e., concurrent operation of multiple DDAs). The DDAs of the '854 patent operate in a conventional manner in that the setup, prepare-to-render, and render phases are performed sequentially for one primitive at a time.

As can be seen from the above, an improved DDA having reduced or no setup time and one that can concurrently process multiple fragments would improve the rendering process.

SUMMARY OF THE INVENTION

The invention provides a digital differential analyzer (DDA) with parallel processing paths. This DDA architecture provides efficient rendering of graphical images with minimal increase in hardware complexity. In particular, the inefficiency related to the setup phase of the rendering process could be eliminated or greatly reduced in some embodiments of the invention.

An embodiment of the invention provides parallel processing paths through the use of a pipeline that is implemented by double buffering. In thus embodiment, some of the input data registers (i.e., for the dPdx and dPdyDom parameters) are implemented with double buffers. Each double buffer includes an external register that corresponds to a setup path and an internal register that corresponds to a render path. While the rendering phase is being performed for the current primitive using the internal registers, the setup phase for the next primitive can be performed and the external registers can be updated. The two paths are synchronized with a prepare-to-render instruction.

A specific embodiment of the invention provides a DDA that includes at least one input buffer and a number of parallel processing paths. The input buffer receives at least one sequence of messages. The parallel processing paths couple to the input buffer and are capable of executing multiple messages substantially concurrently. At least one processing path includes an arithmetic unit.

Another specific embodiment of the invention provides a DDA that includes at least one input buffer, at least one output buffer, and an arithmetic unit. The input buffer receives input data values associated with an object, and the output buffer stores calculated output data values. The arithmetic unit operatively couples to the input and output buffers and computes the calculated output data values based on selective ones of the values from the input and output buffers. The DDA is capable of receiving input data values and calculating output data values substantially concurrently.

Yet another specific embodiment of the invention provides a digital differential analyzer (DDA) that includes a first and a second multiplexer, a first and a second register, and a first arithmetic unit. The first arithmetic unit couples to the first and second multiplexers and to the first and second registers. The first multiplexer further couples to the first and second registers. The first multiplexer further receives a starting value for the parameter P and the second multiplexer receives a set of gradient values for the parameter P. The first arithmetic unit computes a first result and a second result, with each result being based on a set of the values from the first and second multiplexers. The first result is stored in the first register and the second result is stored in the second register. The DDA can further include a second arithmetic unit that couples to the first arithmetic unit. The second arithmetic unit allows the DDA to concurrently process multiple fragments of an object.

Yet another specific embodiment of the invention provides a computer subsystem that includes a rasterizer and at least one DDA. The rasterizer generates one or more sequences of messages, with each message including an instruction and its associated data. The DDA couples to the rasterizer and receives the one or more sequences of messages. Each DDA includes parallel processing paths capable of executing multiple messages substantially concurrently. In one implementation, each DDA includes at least one input buffer to receive input data values associated with an object, at least one output buffer to store calculated output data values, and an arithmetic unit operatively coupled to the at least one input buffer and the at least one output buffer. The arithmetic unit provides the calculated output data values based on selected ones of the values from the at least one input buffer and the at least one output buffer.

Yet another specific embodiment of the invention provides a method for rendering graphical objects. The method includes: (1) receiving a high level description of the graphical objects; (2) transforming the high level description into a plurality of sequences of messages, with each message including an instruction and its associated data; (3) receiving setup information for a particular primitive of the object; and (4) rendering another particular primitive. The receiving and rendering are performed substantially concurrently within one DDA. The invention further provides a computer program product that implements the method described herein.

The foregoing, together with other aspects of this invention, will become more apparent when referring to the following specification, claims, and accompanying drawings.

DESCRIPTION OF THE SPECIFIC EMBODIMENTS

Computer System

Figure 1:
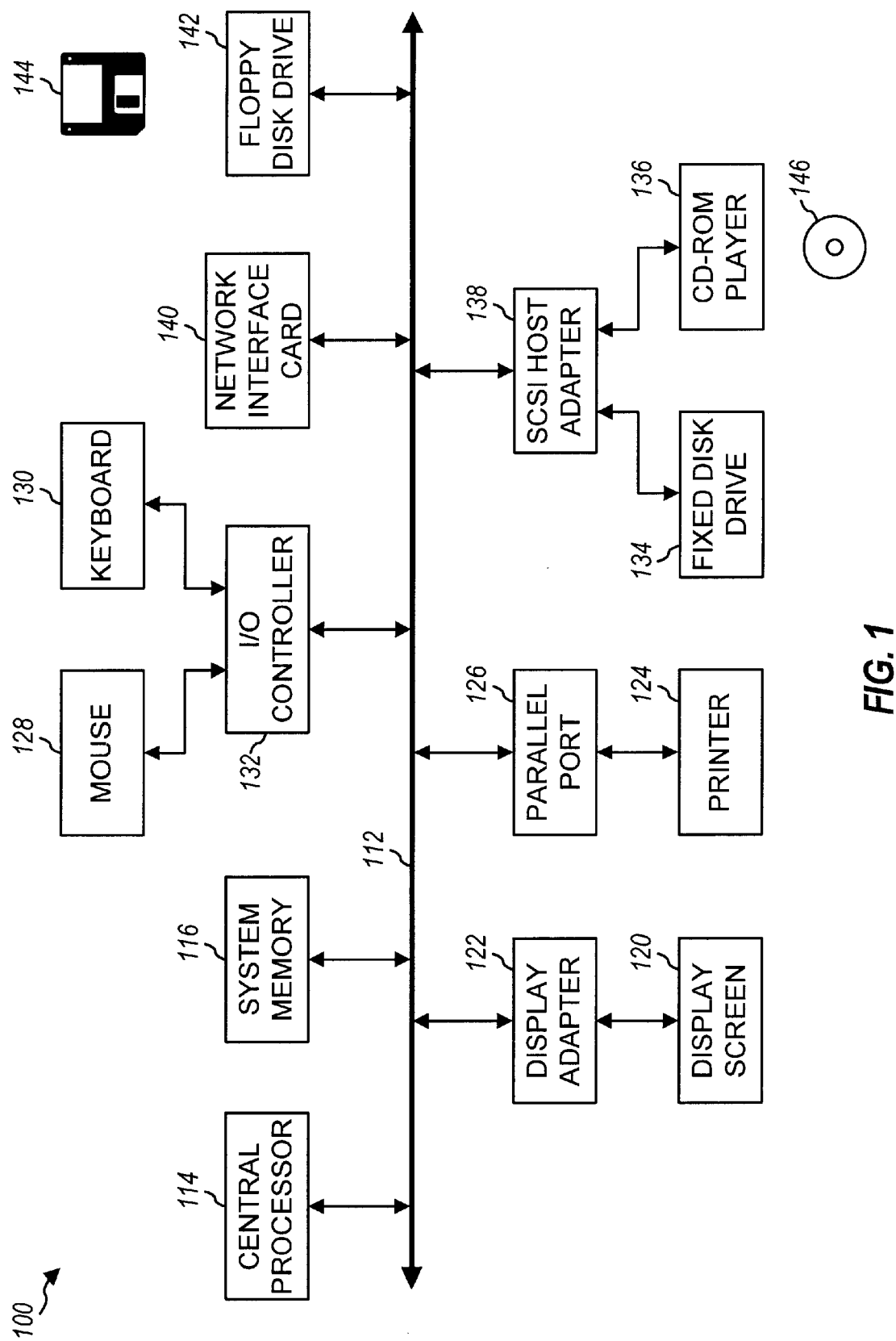
FIG. 1 shows the basic subsystems of a computer system suitable for use with the present invention.

FIG. 1 shows the basic subsystems of a computer system 100 suitable for use with the present invention. In FIG. 1, computer system 100 includes a bus 112 that interconnects major subsystems such as a central processor 114, a system memory 116, and external devices such as a display screen 120 via a display adapter 122, a printer 124 via a parallel port 126, a mouse 128 and a keyboard 130 via an input/output (I/O) controller 132, a fixed disk drive 134 and a CD-ROM player 136 via SCSI hose adapter 138, a network interface card 140, and a floppy disk drive 142 operative to receive a floppy disk 144.

Many other devices or subsystems (not shown) can be connected, such as a scanning device, a touch screen, and others. Also, it is not necessary for all of the devices shown in FIG. 1 to be present to practice the present invention. Furthermore, the devices and subsystems may be interconnected in different ways from that shown in FIG. 1. The operation of a computer system such as that shown in FIG. 1 is readily known in the art and is not discussed in detail in the present application. Source code to implement some embodiments of the present invention may be operatively disposed in system memory 116 or stored on storage media such as fixed disk drive 134, floppy disk 144, or a CD-ROM 146 that is operative with CD-ROM player 136.

Graphics Subsystems

Figure 2A:
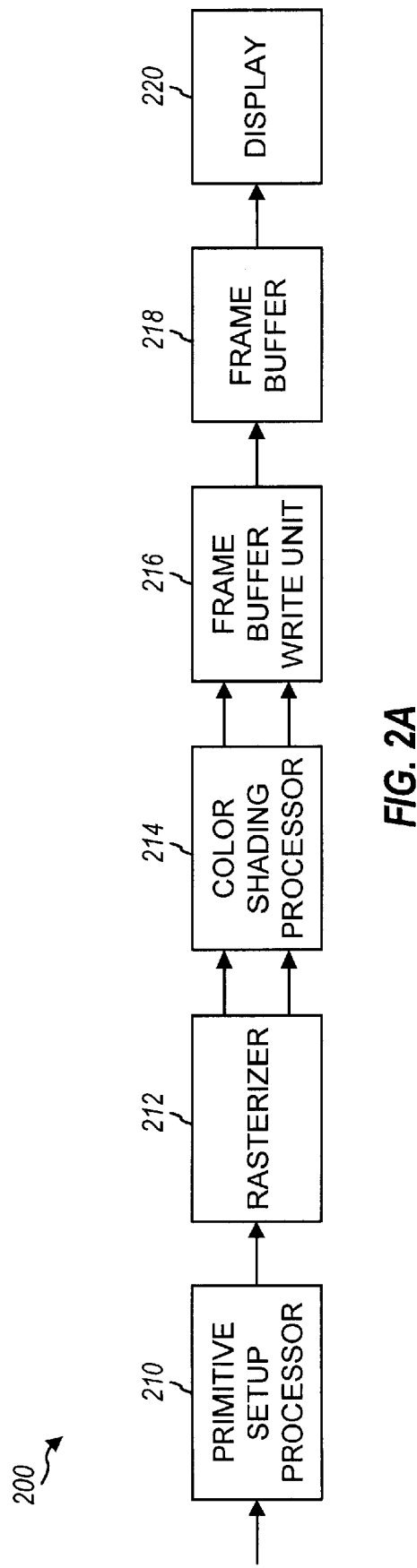
FIG. 2A shows a block diagram of an embodiment of a simplified graphics subsystem.

FIG. 2A shows a simplified block diagram of an embodiment of a graphics subsystem 200. Graphics subsystem 200 can be implement within central processor 114 or display adapter 122 of computer system 100, or on a computer card (e.g., a graphics card) that interfaces to bus 112. Within graphics subsystem 200, graphical information (i.e., in the form of a single message stream) is provided to a primitive setup processor 210. Primitive setup processor 210 processes the information and provides setup information to a rasterizer 212. The setup information can include graphical data and instructions that direct operations of subsequent units within graphics subsystem 200.

Rasterizer 212 processes the graphical data into fragments that are then processed by subsequent units. Rasterizer 212 can perform scan conversion and other functions. Rasterizer 212 then passes both the fragments and the associated instructions to a color shading processor 214. Color shading processor 214 associates a color with a fragment produced by rasterizer 212, and passes the colorized fragment to a frame buffer write 216. Frame buffer write 216 generates pixel values corresponding to the colorized fragment and provides the pixel values to a frame buffer 218 that stores the pixel values. Frame buffer 218 provides the pixels at the required pixel rate to a display 220. The operation of various units within graphics subsystem 200 is further described in the aforementioned U.S. Pat. No. 5,594,854.

For simplicity, FIG. 2A shows an embodiment of a graphics subsystem that includes only one processor (e.g., color shading processor 214). Generally, each processor includes at least one digital differential analyzer (DDA) that performs the bulk of the mathematical computations required to render a primitive. Graphics subsystems typically include a number of processors, and the processors can be arranged in various configurations. An example of a more complex graphics subsystem is described in the aforementioned U.S. Pat. No. 5,594,854. Another graphics subsystem is described in the attached Exhibit A. A class of graphics processors, referred to as the GLINT processors, is described by Baldwin D. et al. in "GLINT 300SX Programmer's Reference Manual", 3Dlabs Inc., 1993 and 1994, which is incorporated herein by reference. These various embodiments of graphics subsystems are within the scope of the invention.

As shown in FIG. 2A, the interface between rasterizer 212 and color shading processor 214, and between color shading processor 214 and frame buffer write unit 216, includes two buses. One bus is used to carry data and instructions for a setup path and the other bus is used to carry data and instructions for a render path. The use of two buses facilitates the operation of the DDAs within the processor, as described below.

Figure 2B:
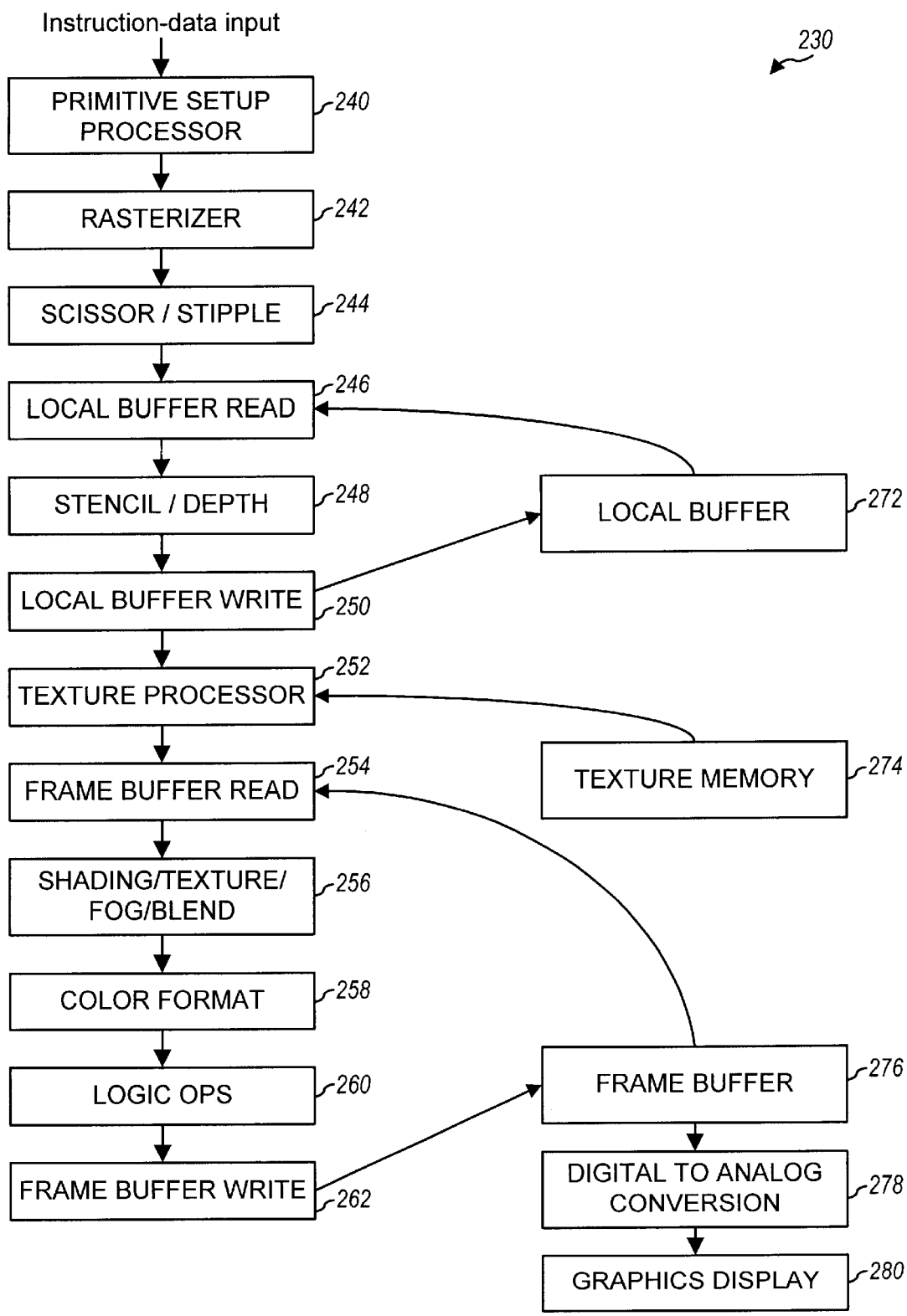
FIG. 2B shows a block diagram of an embodiment of a raster graphics pipelined architecture implemented within a 3-D graphics rendering integrated circuit (IC)

FIG. 2B shows a block diagram of an embodiment of a raster graphics pipelined architecture implemented within a 3-D graphics rendering integrated circuit (IC). As shown in FIG. 2B, a graphics pipeline 230 includes a number of processors, storage elements, buffers, and others. These elements collectively cooperate to generate graphical images that are displayed on a graphics display 280. The various elements and their functionality are described in the aforementioned U.S. Pat. No. 5,594,854.

Within a graphics pipeline 230, the processors are interconnected in a pipeline fashion. The adjacent processors communicate through message passing. A first-in-first-out (FIFO) buffer (not shown in FIG. 2B) is located between each pair of upstream and downstream processors to provide load balancing. For example, with reference to a texture processor 252, a stencil/depth processor 244 is upstream and a color format processor 258 is downstream. The FIFO is typically two messages deep, although FIFO of other depths can also be used.

The messages control and synchronize the processors in the graphics pipeline. In an embodiment, each message has two fields—an instruction field and a L bit data field, where L typically has a minimum value (e.g., L having a minimum value of 32). Between processors, the width of the data field may be wider than 32 bits to supply more data within the same clock cycle. For example, the data field width may be 72 bits between texture processor 252 and frame buffer read processor 254. If the downstream processor cannot accept a message (i.e., because its input buffer is full), then the upstream processor stalls until space is available in the buffer.

Upon receiving a message and decoding the instruction field of the message, a processor can execute, for example, one of the following actions:

1. Update some local states of the processor. The local state of the processor is updated and the message is consumed. The consumed message is deleted from the message stream and not passed to the next downstream processor.
2. Execute a processing action appropriate for the processor. The processing action specific to the processor is executed. This may necessitate the generation of new messages and/or the modification of the original message before sending it to the next downstream processor.
3. Recognize the message as not belonging to the first two categories. The processor passes the message to the next downstream processor.

Typically, the primitive setup processor performs floating-point (FLP) arithmetic while the other processors perform fixed-point (FXP) arithmetic. The order of processors in the pipeline in FIG. 2B shows the order in which operations are performed. For example, since scissor/stipple processor 244 is located before texture processor 252, any fragment that fails a scissor test or a stipple test does not cause a texture access. This implementation makes best use of the processing capacity of the graphics pipeline. All processors in the pipeline can be thought of as independent.

Rendering a Primitive

To provide a better understanding of the invention, the rendering process for a triangle is briefly described. Generally, the term "pixel" is used to describe a picture element on a screen or in a memory. The term "fragment" is used to describe a portion of a triangle or other primitives that project onto a pixel. However, a fragment may cover only a portion of a pixel.

Figure 9A:
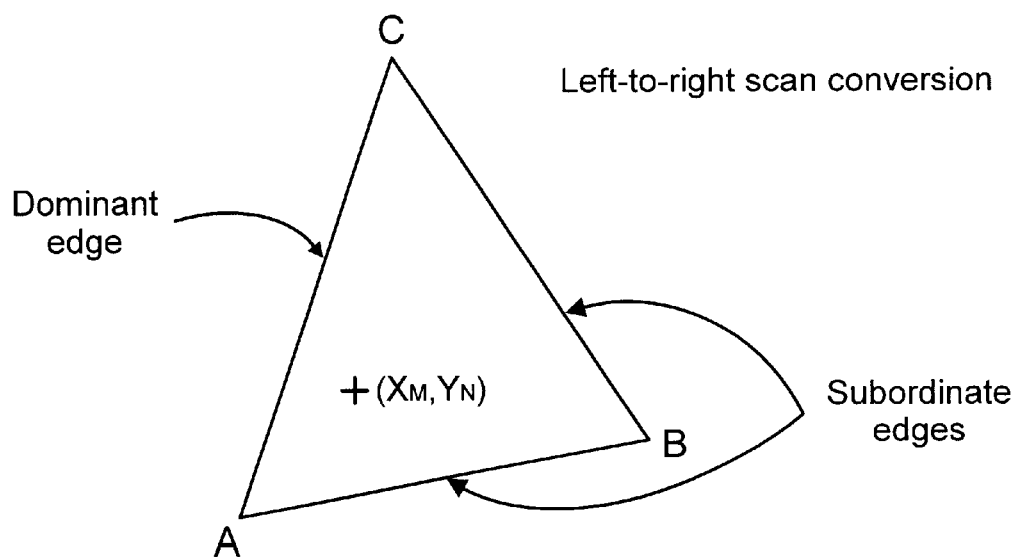
FIGS. 9A and 9B show a left-to-right scan conversion and a right-to-left scan conversion, respectively, of a triangle.
Figure 9B:
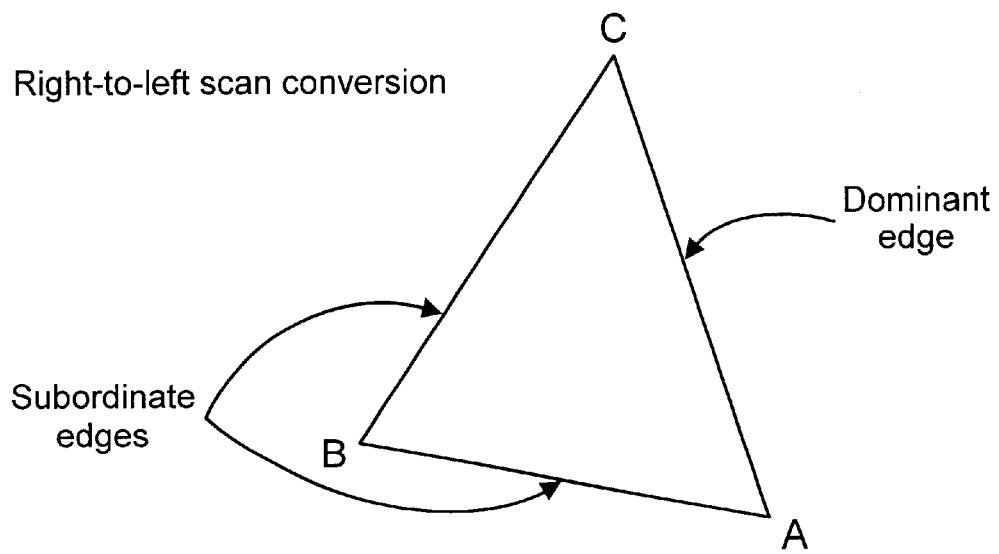

FIGS. 9A and 9B show a left-to-right scan conversion and a right-to-left scan conversion, respectively, of a triangle. A triangle has three edges, a dominant edge and two subordinate edges. The dominant edge is defined as the edge that covers the maximum vertical (Y) extent, or the edge having the greatest range of vertical values. A vertex is an intersection of two edges of the triangle. As shown in FIGS. 9A and 9B, each of the triangles includes vertices A, B, and C. For each triangle, edge AC is the dominant edge, edge AB is a subordinate edge, and vertex B is the knee of the triangle.

For a triangle that is to be texture mapped, texture coordinates S and T associated with the pixels in the triangle are interpolated based on a set of parameter values. During the setup phase for a triangle, before scan conversion of the triangle begins, a processor (e.g., texture processor 252) receives messages to update (or set up) its internal registers with the values of parameters of the triangle. These setup parameter values include:

(SStart, dSdx, dSdyDom), (TStart, dTdx, dTdyDom), and (QStart, dQdx, dQdyDom).

The setup parameter values are calculated by a primitive setup processor 240 that is upstream in the 3-D rendering pipeline. These values allow the texture coordinates of each fragment in the triangle to be determined by linear interpolation. A processor (e.g., texture processor 252) calculates the texture coordinates (with or without perspective correction) associated with the pixels in the triangle.

Typically, S and T are uncorrected for perspective. To provide a perspectively "correct" interpolation of S and T, perspective correction of the interpolation of the triangle parameters (i.e., the texture coordinates) is performed so that the parameters follow the rules of perspective. Perspectively correct interpolation is non-linear in screen coordinate space. A division by depth is performed for the texture-mapped triangles to appear visually correct. The true perspective corrected texture coordinates are calculated as:

$S_{OUT}=S/Q$, and $T_{OUT}=T/Q$.

For a pixel located at $X_M$, $Y_N$ in a triangle (e.g., on the (N+1)th scan line from starting vertex A and (M+1)th pixels from the dominant edge AC of the triangle) the S, T, and Q parameters are determined. An accurate method to calculate the values of the S, T, and Q parameters is to use the (X, Y) coordinate of the fragment and substitute this into a plane equation for each parameter. This method provides an accurate result but is computationally expensive. An alternative method that is less computationally intensive, and also provides a good approximation, linearly interpolates the S, T, and Q values of a fragment at $X_M$, $Y_N$. Linearly interpolation is performed in accordance with the following equation:

$$P=PStart+N \cdot dPdyDom+M \cdot dPdx, \qquad Eq.(1)$$

where

PStart is the value at the starting vertex;

dPdx is a change in parameter P for a unit change in x (i.e., the gradient along the scan line);

dPdyDom is a change in parameter P for a unit change in y along the dominant edge of the triangle (i.e., the gradient along the dominant edge); and P is the calculated parameter value for the pixel located at XM, YN.

Equation 1 can be used to compute for P=S, T, and Q. Equation 1 is equivalent to adding dPdyDom for each scan line from PStart to the (N+1)th scan line, and then adding dPdx for each fragment along the (N+1)th scan line from the dominant edge to the point $X_M$, $Y_N$. The gradient along the dominant edge dPdyDom and the gradient along the scan line dPdx are given by the following:

$$dPdyDom=dP/dy(AC)=(P_A-P_C)/(Y_A-Y_C); \qquad Eq.(2)$$

$$dPdx=((P_A-P_C)(Y_B-Y_C)-(P_B-P_C)(Y_A-Y_C))/abs(v); \qquad Eq.(3)$$

where v is the vector product of the two edges AC and BC given by:

$$V=(X_A-X_C)(P_B-P_C)-(X_B-X_C)(P_A-P_C); \qquad Eq.(4)$$

where $P_A$ is the value of the P parameter (e.g. texture coordinate S) associated with the vertex A, and $X_A$ and $Y_A$ are the X and Y coordinates associated with the vertex A. The same notation is followed for the other two vertices.

The start value of the P parameter on the (N+1)th scan line is given by $$P=PStart+N \cdot dPdyDom. \qquad Eq.(5)$$

This equation interpolates the parameter value at the intersection of the dominant edge and the scan line. However, the value at the center of the pixel, and not the value at this intersection point, is the desired interpolated value. The desired interpolated value can be obtained through the use of subpixel correction.

Figure 9C:
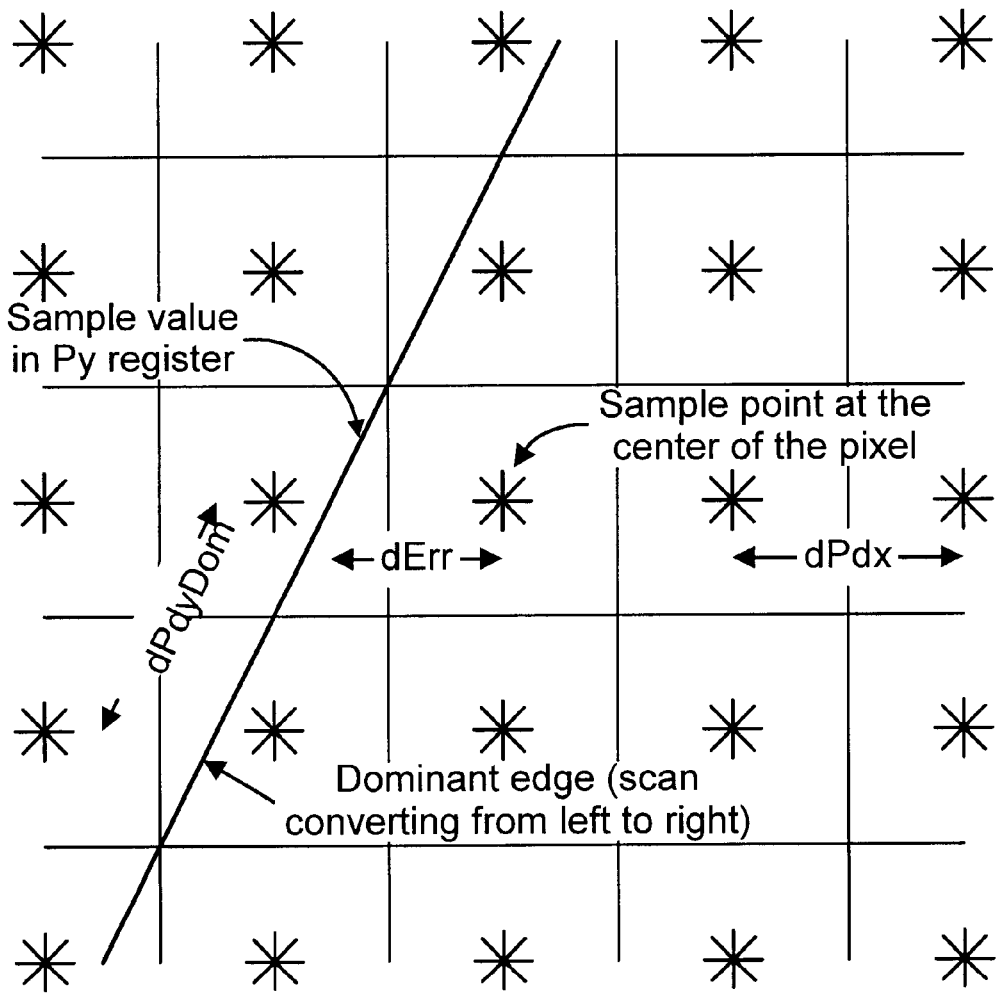
FIG. 9C shows a diagram that illustrates subpixel correction.

FIG. 9C shows a diagram that illustrates subpixel correction. FIG. 9A shows scan conversion from the dominant edge on the left to subordinate edges on the right. The sample value in the Py register is dErr units away from the sample point at the center of the pixel, where dErr is the error distance between the mathematically drawn dominant edge and the center of the pixel for a given scan line. The start value for parameter (P) can be nearly dPdx (one step in the X direction) out, so dErr is less than 1.0 in magnitude. The subpixel corrected value of the P parameter at the first sample point on the scan line is:

$$P=PStart+N \cdot dPdyDom+dErr \cdot dPdx; \qquad Eq.(6)$$

where $-1.0<dErr<+1.0$. This requires a multiply operation for each parameter and for each new scan line.

The error dErr is computed by the rasterizer. The texture address processor, upon decoding the SubPixelCorrection message, computes the corrected P value according to equation 6. This correction is used at the beginning of every scan line. The parameter value at the start vertex A of a triangle is typically offset from the horizontal center of a pixel. Therefore, a similar subpixel correction is performed in the Y direction. The primitive setup processor performs these subpixel corrections, in both the X and Y directions, once, at the start of the triangle. Hence, the start value PStart of the P component can be corrected to move it to the center of a pixel in the X and Y directions.

In one embodiment, the rasterizer sends the correction value dErr in sign magnitude format with 4 bits of magnitude and a sign bit in the SubPixelCorrection message, providing for 4 bits of resolution of dEiT or a resolution of $\frac{1}{16}$ of the dPdx derivative. For a positive correction this means adding in dPdx/2 when bit 3 is set, dPdx/4 when bit 2 is set, dPdx/8 when bit 1 is set and dPdx/16 when bit 0 is set. For a negative correction the corresponding partial products are subtracted. The partial products dPdx/2n may be derived by an arithmetic right shift to retain the sign of the dPdx parameter.

Subpixel correction is used for high quality aliased rendering using interpolated parameters to ensure that the interpolated parameters associated with a fragment (color, depth, fog, texture) are correctly sampled at the center of a pixel. This ensures consistent shading of objects comprising many triangles. If subpixel correction is not performed, then textures appear to move or scintillate on triangles when the eyepoint is in motion.

The rasterizer scan converts a given triangle, from the dominant edge to the subordinate edge along the span, into a sequence of fragments for processing by the remaining downstream processors. Edge walking is a technique that determines which fragments are to be drawn as a triangle is rendered. The rasterizer walks the dominant and subordinate edges of the triangle and fills in the spans in between. As the walk progresses, the rasterizer generates messages to indicate the direction of the next step. The messages include:

1. StepX (move horizontally away from the dominant edge by one unit in X), or

2. StepYDomEdge (move vertically along the dominant edge to the next span).

The rasterizer generates one step message per pixel within the triangle boundary. The step messages are grouped either as active or passive. A step message begins as an active step. An active step message may change to a passive step if this fragment fails one of the tests (e.g., depth test) on its path down the graphics pipeline. The step messages are passed down the entire graphics pipeline to keep the interpolated values of all the DDA circuits in synchrony.

Rendering Process

Conventionally, the rendering process is performed sequentially such that the three rendering phases (e.g., setup, prepare-to-render, and render) are performed and completed for a particular primitive (e.g., a triangle or a line) before the next primitive is rendered. Table 1 shows a conventional sequence of phases of operations at a particular processor that includes one DDA datapath. As used herein, a datapath is an interconnection of resources (e.g., hardware) that implement the required functions. The datapath includes one or more executions units (such as arithmetic logic units (ALUs) or shifters), registers, and the communication paths between the units.

TABLE 1

Operations setup # N − 1
prepare-to-render # N − 1
render # N − 1
setup # N
prepare-to-render # N
render # N
setup # N + 1
prepare-to-render # N + 1
render # N + 1

The setup phase includes one or more setup messages. The prepare-to-render phase typically includes only one message (e.g., the "Prepare-to-Render" or "PTR" message). And, the render phase includes one or more messages such as active and passive step messages and "SubPixelCorrection" messages.

In one embodiment of the invention, the rendering process is improved by performing some of these operations using parallel paths (e.g., a setup path and a render path). Table 2 shows a sequence of operations using parallel setup and render paths.

TABLE 2

| Setup Path | Render Path |
| --- | --- |
| setup # N − 1 | |
| prepare-to-render # N − 1 | prepare-to-render # N − 1 |
| setup # N | render # N − 1 |
| prepare-to-render # N | prepare-to-render # N |
| setup # N + 1 | render # N |
| prepare-to-render # N + 1 | prepare-to-render # N + 1 |
| | render # N + 1 |

As shown in Table 2, the setup and render paths are synchronized by the prepare-to-render message.

The improvement using parallel paths can be quantified as follows. Suppose S clock cycles are required for the setup phase, one clock cycle is required for the prepare-to-render phase, and R clock cycles are required for the render phase. Conventional rendering process using sequential operations would require S+R+1 clock cycles. In contrast, the rendering process using two parallel paths would require max(S,R)+1 clock cycles, where max(S,R) equals the greater of S or R.

In one embodiment, parallel paths can be provided by the use of double buffering within the rendering process (i.e., within the DDA). In this embodiment, some of the input data registers are implemented with double buffers. Each double buffer includes an external register and an internal register. The external register corresponds to the setup path and the internal register corresponds to the render path. The external registers couple to the input data bus and store the necessary graphical data. When the prepare-to-render message is received, the contents of the external registers are transferred to the internal registers.

Double buffering allows concurrent operation of the setup and render phases. While the rendering phase is being performed for the current primitive using the internal registers, the setup phase for the next primitive can be performed and the external registers can be updated. Synchronization of the two paths is achieved with the prepare-to-render message. In fact, the prepare-to-render message in the setup and render paths can be synchronized, to maintain a coherent rendering, through a simple mechanism such as the use of toggle bits in the two paths. The synchronization mechanism prevents the setup messages of setup phase #N+2 from proceeding at a given processor until after all render messages of render phase #N have been executed at that processor (setup phase #N+1 and render phase #N can proceed concurrently). This ensures that the results of the parallel setup and render process are the same as those of a sequential setup and render process.

The inputs of all external registers can be connected to a common input bus. This reduces delay (i.e., latency) in the setup path. The delays of computational function datapaths are not affected by the delays from the setup path because these datapaths reside solely in the render path. The external registers can be optimized for small silicon area and low power consumption.

The setup and render paths essentially operate on two different instruction sets. Thus, the instruction word width does not have to be identical for the two paths. Also, the data word width does not have to be identical for the two paths. In fact, for improved performance, the data word width for the setup path can be a fixed word width (e.g., 32 bits) while the data word width for the render path may be varied along the length of the render pipeline.

The setup and render instruction sets can be implemented in a manner that is transparent to a programmer. In fact, the programmer may utilize an instruction set similar to that of a conventional graphics system. The graphics system then decodes the programmed instructions and generates the corresponding messages for the setup path, the render path, or both (e.g., for the prepare-to-render message).

With the double buffer architecture, the processing units preceding the DDAs (e.g., primitive setup processor 210 and rasterizer 212 in FIG. 2A) can be operated with less interruptions (i.e., stalled less often). Generally, since additional buffering is provided by each DDA through the use of double buffering, less buffering would be required in the preceding units. The external registers thus provide a "distributed buffering" across the DDAs.

Parallel Setup and Render Paths

Figure 3:
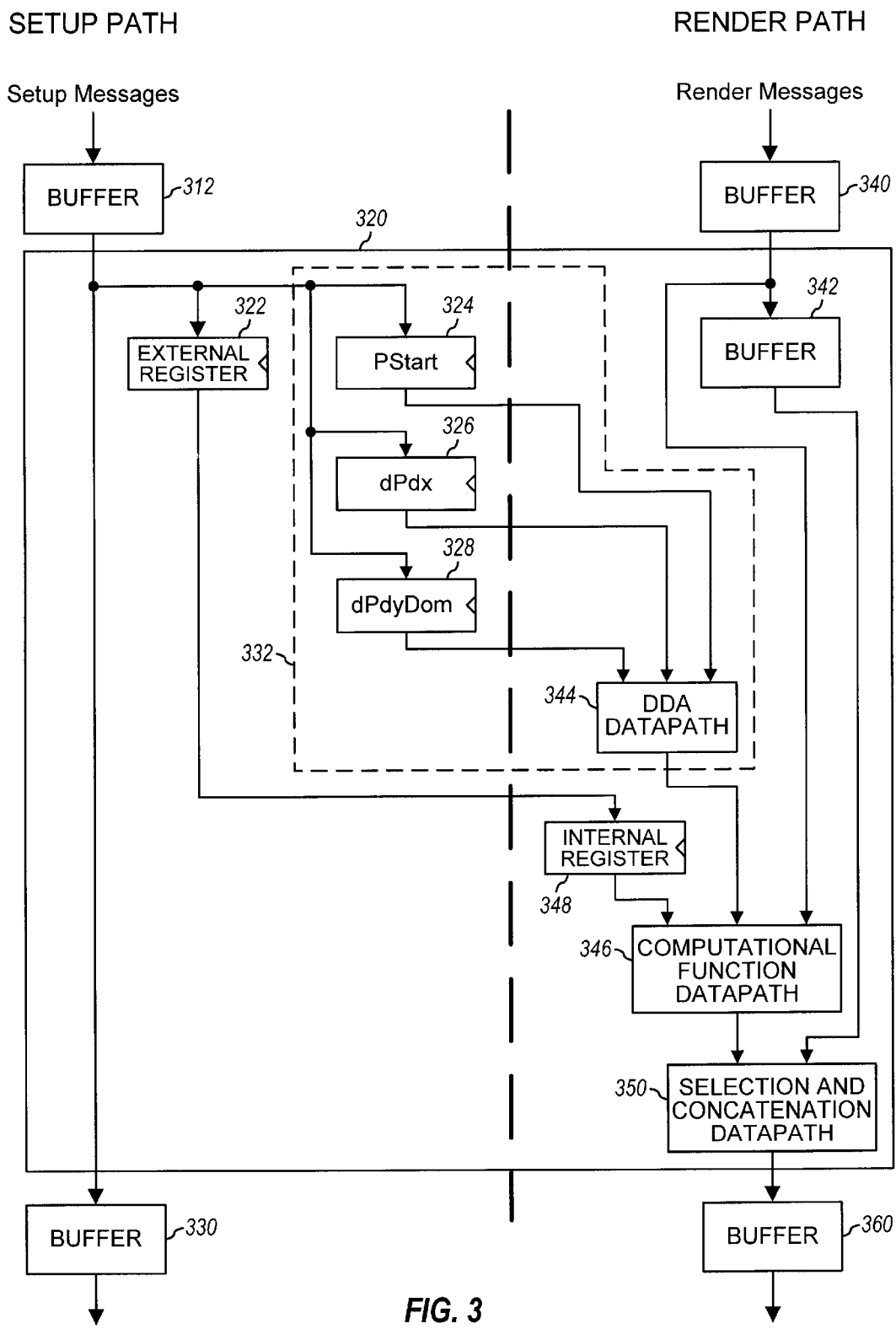
FIG. 3 is a block diagram of an architecture of the invention that supports parallel setup and render paths.

FIG. 3 is a block diagram of an architecture of the invention that supports parallel setup and render paths. In the setup path, setup messages are received from a preceding unit (e.g., rasterizer 212 in FIG. 2A) and provided to a buffer 312. The setup messages are then provided to a processor 320. Processor 320 can be used to perform, for example, color shading, depth interpolation for z-buffer algorithm for visible surface determination, or texture coordinate interpolation for texture mapping. Color shading processor 214 in FIG. 2A can be implemented with processor 320.

The setup information directed for processor 320 is provided to an external register 322, a PStart register 324, a dPdx register 326, and a dPdyDom register 328. The setup information directed for subsequent processors is provided to a buffer 330. The setup information in registers 324, 326 and 328 are subsequently provided to a DDA datapath 344. DDA datapath 344 and registers 324, 326, and 328 are elements of a DDA 332.

In the render path, render messages are received from a preceding unit (e.g., rasterizer 212 in FIG. 2A) and provided to a buffer 340 and further to a buffer 342 within processor 320. The render messages directed for processor 320 are used to control a DDA datapath 344 and a computational function datapath 346. The value stored in external register 322 is provided to an internal register 348 within the render path. Computational function datapath 346 further couples to DDA datapath 344, internal register 348, and a selection and concatenation datapath 350. Selection and concatenation datapath 350 also couples to buffer 342 and receives render messages directed for subsequent processors. Buffers 312, 330, 340, 342, and 360 can be implemented as first-in-first-out (FIFO) buffers or other types of buffer.

Buffer 342 primarily masks the delay of computational function datapath 346. Therefore, the depth of buffer 342 matches the delay of computational function datapath 346. If computational function datapath 346 is implemented with combinatorial logic, buffer 342 can be a simple wiring bus. In general, the delay of the render path is equal to or greater than the delay of the setup path.

Selection and concatenation datapath 350 either: (1) selects messages (e.g. passive step messages or "SubPixel-Correction" messages) from buffer 342 and forwards them to buffer 360, or (2) concatenates instructions (e.g., active step instructions) from buffer 342 with the results for a fragment from computational function datapath 346 and forwards them to buffer 360. An instruction may also be changed. For example, an active step message may become a passive message if its associated fragment is determined to be invisible by a depth processor.

The controller(s) controlling datapaths 344, 346, and 350 are not shown, for simplicity.

The number of DDA datapaths 344 and the functions performed by computational function datapath 346 depend on the type of processor in which these datapaths reside. For a color shading processor using Gouraud shading, there are three or more instances of DDA datapaths 344, one each for the red, green, and blue (RGB) color components. For this processor, computational function datapath 346 basically passes the interpolated values. For a texture coordinate processor, there are three DDA datapaths 344 for interpolating the 3-D homogeneous vector (S', T', Q)=(SQ, TQ, Q) corresponding to the texture coordinates (S, T). For this processor, computational function datapath 346 computes (S, T)=(S'/Q, T'/Q) for perspective correct projective texture mapping, or optionally computes (S, T)=(S', T') for perspective uncorrected affine texture mapping. For a depth processor, there is one DDA datapath 344 to interpolate the depth z. For this processor, computational function datapath 346 compares z to the z-buffer value provided in the active step message. If a fragment is not visible, then the corresponding active step message is transformed into a passive step message. Generally, the number of DDA datapaths 344, the number of computational function datapath 346, and the function of computational function datapath 346 are specifically tailored for each type of processor.

The DDA datapaths can be operated in parallel (e.g., red, green and blue DDA datapaths within a shading processor). The DDA datapaths may also be operated in a pipeline (e.g., a Z DDA datapath of a depth processor and (R, G, B) DDA datapaths in a shading processor). It is also conceivable and possible to operate DDA datapaths with different functionality in parallel (e.g., (Z, R, G, B) DDA datapaths in a unified shading and depth processor) to reduce the delay of a "hyper-pipeline."

Typically, each render message such as StepX and StepY-DomEdge affects only one fragment. A sequence of render messages affect a set (or collection) of fragments. The set of fragments corresponding to one render phase comprises the entire primitive. Each setup phase typically prepares all parameters required to render one primitive.

Digital Differential Analyzer (DDA)

The DDA performs the basic arithmetic operations for incremental interpolation required by a, graphics subsystem. Initially, for each primitive, the DDA receives a start value (PStart) for a parameter P, a gradient value in the horizontal direction (dPdx), and a gradient value along a line or along a dominant edge of a screen aligned trapezoid (dPdyDom). The PStart value is the value of the parameter or attribute at the starting vertex of the triangle, adjusted to the center of the pixel. The "adjustment" is a subpixel correction in the vertical and horizontal directions performed by either a host or a primitive setup processor. The gradient value is indicative of a change in parameter P for a unit change in x or the dominant edge. Parameter P can be color (e.g., red, green, and blue), opacity (e.g., alpha), depth, or other graphical information to be interpolated.

When a prepare-to-render message (e.g., "PrepareToRender") is received, the DDA initializes Px and Py with the PStart value. For a scan conversion from the dominant edge on the left to the subordinate edges on the right (i.e., scan conversion from left to right), the Px and Py values are initialized as follows:

$$Px(1)=PStart$$

$$Py(1)=PStart. \quad Eq.(7)$$

For a scan conversion from right to left, the Px and Py values are initialized as follows:

$$Px(1)=PStart+dpdx$$

$$Py(1)=PStart+dPdx. \quad Eq.(8)$$

For each subsequent "valid" clock cycle, the DDA computes the new Px and Py values using a combination of the previous Px and Py values and the dPdx and dPdyDom gradient values. For a message to step in the x direction (e.g., "ActiveStepX" or "PassiveStepX"), the DDA computes the new Px and Py values as follows:

$$Px(n+1)=Px(n)+dPdx$$

$$Py(n+1)=Py(n). \quad Eq.(9)$$

For a message to step along the dominant edge of the triangle (e.g., "ActiveStepYDomEdge" or "PassiveStepYDomEdge"), the DDA computes the new Px and Py values as follows:

$$Px(n+1)=Py(n)+dPdyDom$$

$$Py(n+1)=Py(n)+dPdyDom. \quad Eq.(10)$$

For a subpixel correction message (e.g., "SubpixelCorrection"), the DDA computes the new Px and Py values as follows:

$$Px(n+1)=Py(n)+dErr(n+1) \cdot dPdx$$

$$Py(n+1)=Py(n), \quad Eq.(11)$$

where dErr is an error distance between a mathematically drawn dominant edge and the center of the pixel for a given scan line. The multiplication can be performed by serially summing partial products, as described in the aforementioned U.S. Pat. No. 5,594,854. For all calculations, the new Px and Py values are stored and used for calculation of subsequent Px and Py values. The Px value after any required clamping is also provided as the DDA output. This output is the clamped and interpolated P parameter.

Figure 4:
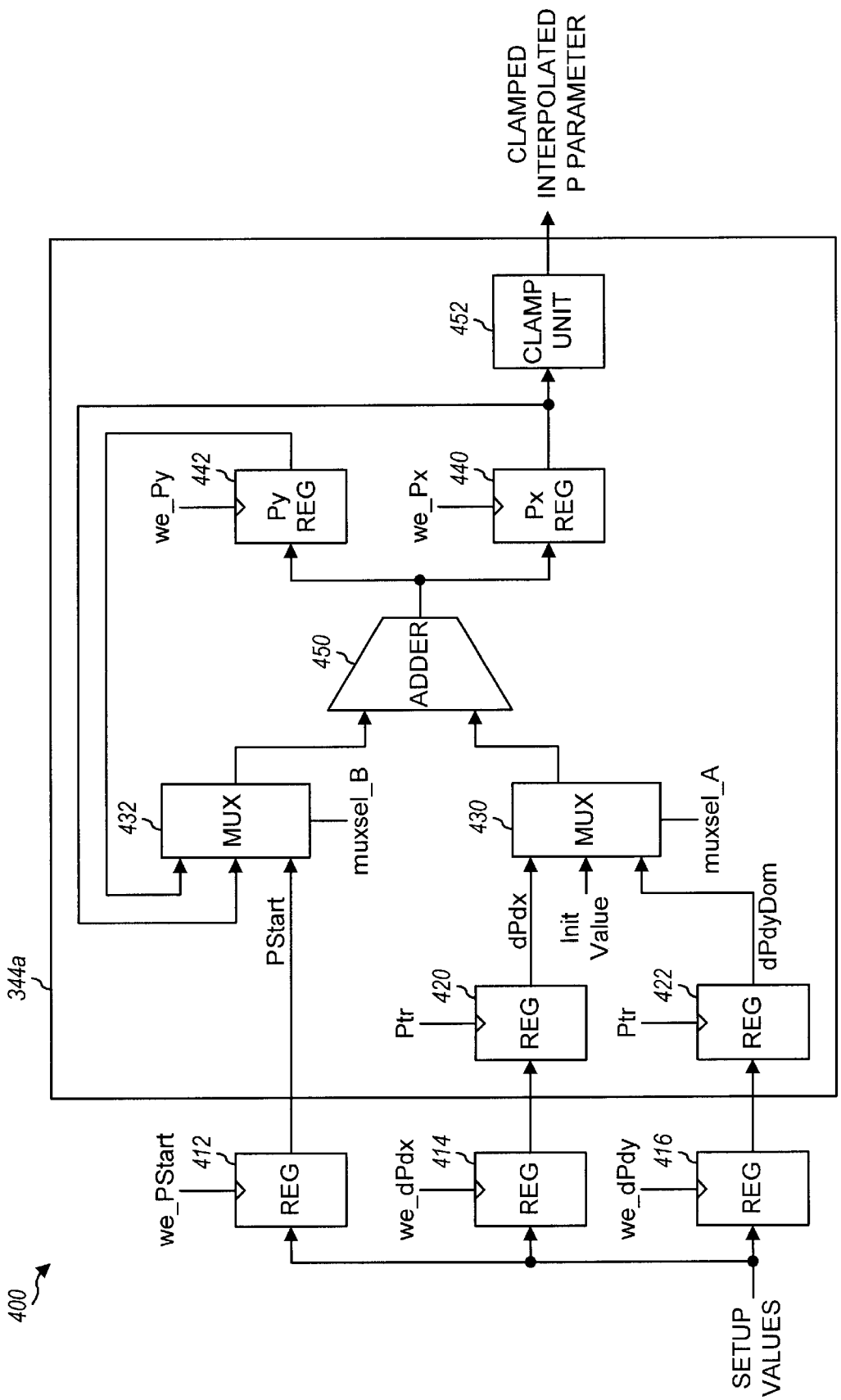
FIG. 4 shows a block diagram of an embodiment of a digital differential analyzer (DDA) of the invention.

FIG. 4 shows a block diagram of an embodiment of a DDA 400 of the invention. DDA 400 includes a DDA datapath 344a that implements DDA datapath 344 of FIG. 3. DDA 400 can be incorporated within color shading processor 214 of graphics subsystem 200, and other processors within other graphics systems.

Within DDA 400, the input data is provided to three registers 412, 414, and 416. Register 412 stores the PStart value, register 414 stores the dPdx value, and register 416 stores the dPdyDom value. These values can be sent serially on a data bus and loaded into the proper registers 412, 414, and 416 by selectively enabling the respective write enable lines we_PStart, we_dpdx, and we_dPdy. In FIG. 4, the clock signals for the registers are not shown for simplicity. The registers can be loaded on an edge (e.g., the rising edge) of the clock, provided their associated "write enable" signals are asserted.

Registers 414 and 416 couple to registers 420 and 422, respectively. The dPdx value from registers 414 and the dPdyDom value from register 416 are loaded into registers 420 and 422, respectively, upon activation of a Ptr signal. The Ptr signal is asserted when the "PrepareToRender" message is executed.

A multiplexer (MUX) 430 receives the dPdx value from register 420, the dPdyDom value from register 422, and an initial value (Init Value) which can be a fixed value such as zero. A MUX 432 receives the PStart value from register 412, the Px value from a register 440, and the Py value from a register 442. MUX 430 and MUX 432 provide the appropriate values, based on the respective control signals muxsel_A and muxsel_B, to an adder 450.

Adder 450 adds the two values provided to it. The result from adder 450 is loaded into either register 440 or 442, or both, depending on the state of the control signals we_Px and we_Py. In the embodiment shown in FIG. 4, the Px value from register 440 is provided to a clamp unit 452 that properly formats the output data and prevents overflow and underflow by comparing the Px value against a predetermined output range.

The resolution (i.e., in terms of the number of bits) of the registers, the multiplexers, and the adder is dependent on the requirement of the graphics subsystem. In one embodiment, DDA 400 is designed with more resolution than required and the additional range is used to provide increased accuracy of the intermediate results and to prevent overflow and underflow.

DDA 400 allows parallel execution of the setup and render phases of the rendering process. In the setup phase, the PStart, dPdx, and dPdyDom values are loaded into respective registers 412, 414, and 416 through proper control of the corresponding write enable signals we_PStart, we_dPdx, and we_dPdy. As shown in the embodiment in FIG. 4, these three values are loaded using three (or more) clock cycles since the data is provided to DDA 400 serially on a common bus.

Once the values are loaded, the prepare-to-render phase is a single message that activates the Ptr signal under the control of the controller(s) of the render path. This message causes the dPdx and dPdyDom values to be loaded into registers 420 and 422, respectively.

Initially, the PStart value is provided to register 440 or 442, or both, by controlling MUXes 430 and 432 (i.e., through the muxsel_A and muxsel_B signals) such that the PStart value is added with the zero Init Value by adder 450.

The PStart value is loaded to registers 440 and 442 by activating the respective write enable signals we_Px and we_Py.

The render phase then commences. Subsequent values of Px (or Py) are computed by: (1) selecting the current value of Px (or Py) from MUX 432, (2) selecting the corresponding gradient value dPdx (or dPdyDom) from MUX 430, (3) adding the gradient value dPdx (or dPdyDom) to the current value of Px (or Py), and (4) storing the new Px (or Py) value to register 440 (or 442). The computations for the render messages are defined by equations 9 and 10.

The synchronization of the parallel setup and render paths within DDA 400 is provided by double buffering each of the dPdx and dPdyDom values with two registers, an external register and an internal register. The external register is used during the setup phase and the internal register is used during the render phase. This allows the current dPdx and dPdyDom values to be used while the new values are being loaded. Double buffering of the PStart value is not necessary since this value is used once (i.e., as the starting Px and Py values) and temporarily stored in registers 440 and 442.

Figure 5A:
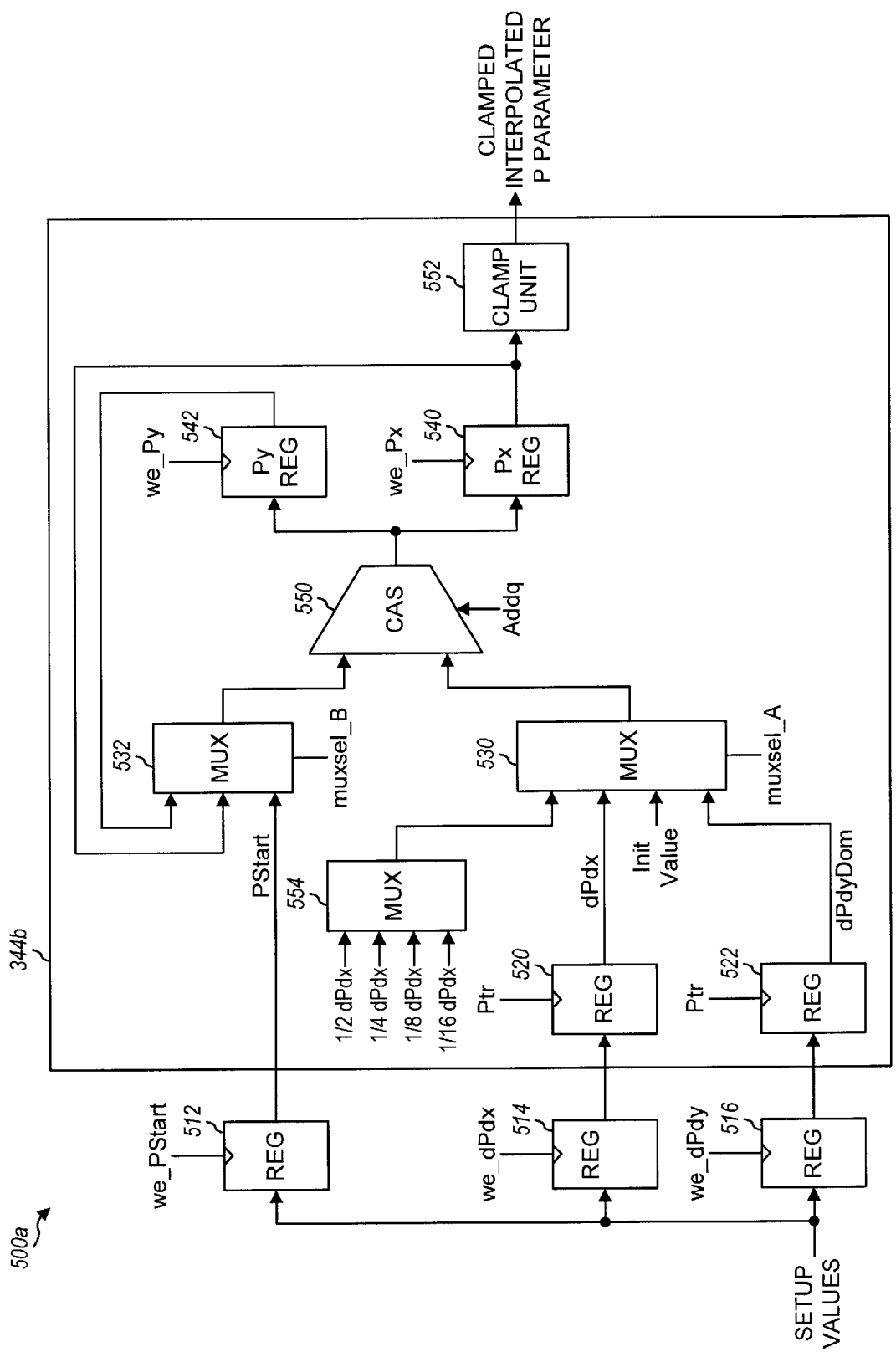
FIG. 5A shows a block diagram of an embodiment of a DDA of the invention capable of coarse subpixel correction.

FIG. 5A shows a block diagram of an embodiment of a DDA 500a of the invention capable of coarse subpixel correction. DDA 500a includes the elements of DDA 400, with adder 450 being replaced by a conditional adder/subtractor (CAS) 550. DDA 500a further includes a fractional element that provides partial products (e.g., $\frac{1}{2}$, $\frac{1}{4}$, $\frac{1}{8}$, and $\frac{1}{16}$) of the dPdx value. In the embodiment shown in FIG. 5A, the fractional element is implemented with a MUX 554.

CAS 550 either adds or subtracts the two input values, depending on the state of a control signal Addq, and provides the result to registers 540 and 542. CAS 550, adder 450, and other units that perform similar or equivalent functions are generically referred to as an arithmetic unit.

Additional improvements in the performance of DDA 500a can be achieved by making a slight modification of this DDA architecture, and by modifying the operation of the processor in which the DDA resides. For a scan conversion from right to left, in accordance with the rasterization rules of OpenGL and X, the first step message for every scan line generated by the rasterizer is a PassiveStepX message. The PassiveStep message updates the DDA but does not cause an update of a fragment in a buffer (e.g. the RGBA components in the frame buffer). Similarly, for a scan conversion from left to right, a PassiveStepYDomEdge message is the last step message on a scan line. Some embodiments of the invention provide techniques to eliminate the need for these passive messages for right-to-left scan conversions (i.e., through a modified DDA datapath), and for left-to-right scan conversion (i.e., through a modified rasterization process).

Figure 5B:
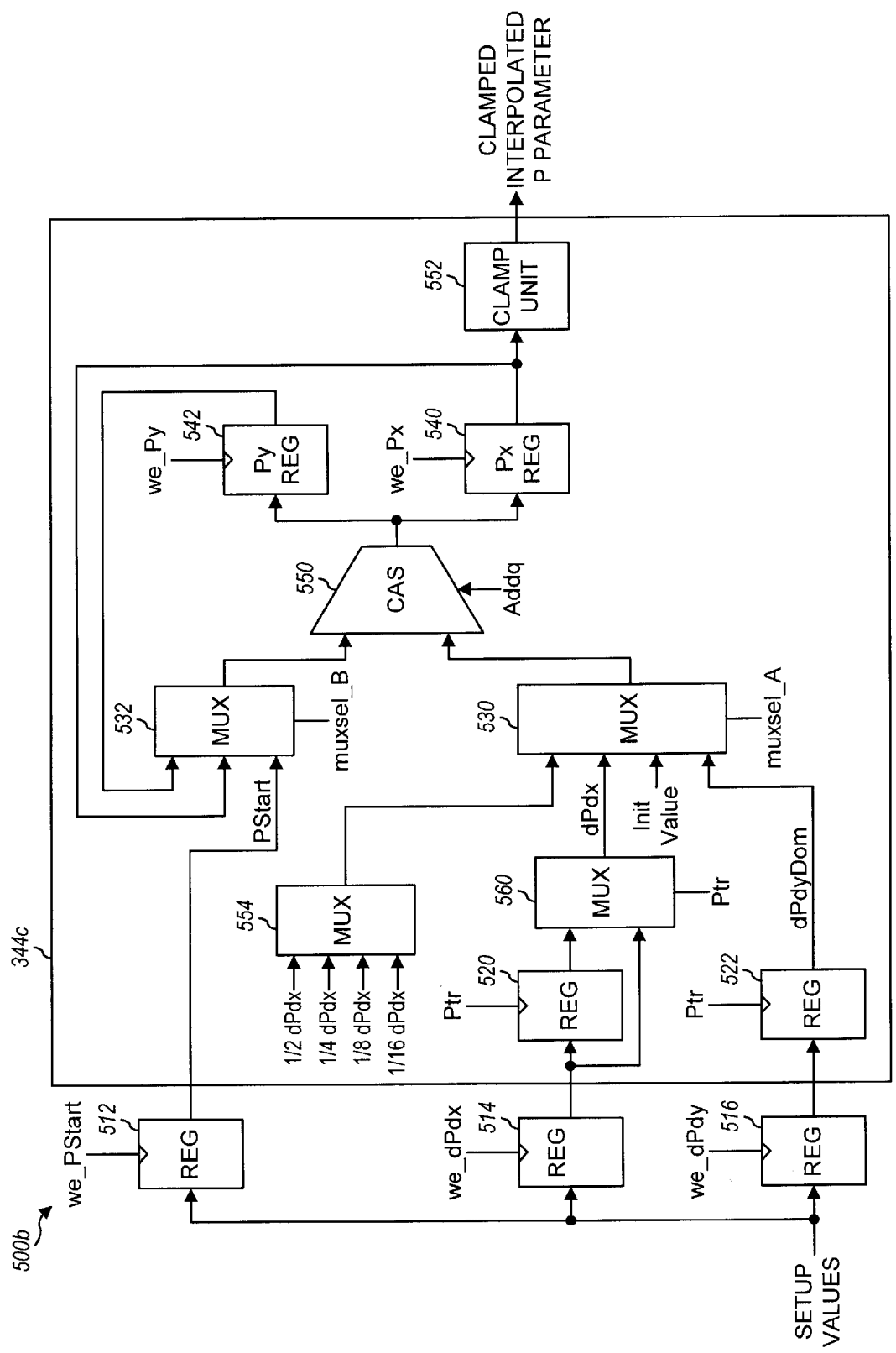
FIG. 5B shows a block diagram of an embodiment of a DDA of the invention capable of coarse subpixel correction and having improved performance for right-to-left scan conversion.

FIG. 5B shows a block diagram of an embodiment of a DDA 500b of the invention capable of coarse subpixel correction and having improved performance for right-to-left scan conversion. DDA 500b in FIG. 5B is similar to DDA 500a in FIG. 5A, with the addition of a MUX 560 interposed between register 520 and MUX 530. One input of MIUX 560 couples to the output of register 514 and the second input of MUX 560 couples to the output of register 520. MUX 560 provides the dPdx value to MUX 530. MUX 560 is controlled by the Ptr signal. MUX 560 selects the output of register 514 if a prepare-to-render operation is performed; otherwise it selects the output of register 520.

DDA 500b implements an additional "feature" of "optimized" right-to-left scan conversion for the prepare-to-render phase. With the use of double buffering, register 520 holds the "old" dPdx value of the "old" primitive for which scan conversion is just completed. Register 514 holds the "new" dPdx value that is used for the initialization ("new" PStart+"new" dPdx) for right-to-left scan conversion of the "new" primitive. The inclusion of MUX 560 allows DDA 500b to perform the prepare-to-render operation for the render path in one clock period. DDA 500a of FIG. 5A performs the prepare-to-render operation for right-to-left scan conversion in two or more clock cycles. In the first clock cycle, register 520 is loaded with the "new" dPdx value from register 514, which was initialized during the setup phase. In the second clock cycle, MUX 530 selects the "new" dPdx value in register 520, and CAS 550 adds it to PStart to compute (PStart+dPdx). DDAs 500a and 500b can both perform "optimized" right-to-left scan conversion if the Py and Px registers are initialized with (PStart+dpdx).

Parallel processing of the setup and render phases (i.e., through double buffering) results in a DDA architecture having improved performance. In some designs, additional buffering of the PStart, dpdx, and dPdyDom values can provide even greater improvement. For example, triple or quadruple buffering can be provided. Since the number of clock cycles required for the render phase increases with the number of fragments in the primitive being rendered, additional buffering can "smooth out" the variations in the execution time of the rendering phase. Generally, a primitive with a larger projected area in 2-D screen space has a larger number of fragments to be rendered. Additional input buffering allows the DDA to perform the rendering of the next primitive as soon as rendering of the current primitive is finished. Thus, the design of the DDA does not need to be based on the longest possible render phase.

Table 3 summarizes the state of the render path for DDA 500 for various instructions.

TABLE 3

| Instruction | MUX 530 output | MUX 532 output | Addq | we_Px 540 | we_Py 542 |
|---|---|---|---|---|---|
| PrepareToRender | zero | PStart | don't care | load | load |
| PrepareToRender (for right-to-left scan conversion) | dPdx | PStart | add | load | load |
| ActiveStepX PassiveStepX | dPdx | Px | add | load | hold |
| ActiveStepYDomEdge PassiveStepYDomEdge | dPdyDom | Py | add | load | load |
| SubPixelCorrection | MUX 554 output | Px | add/ subtract | load | hold |

Figure 6:
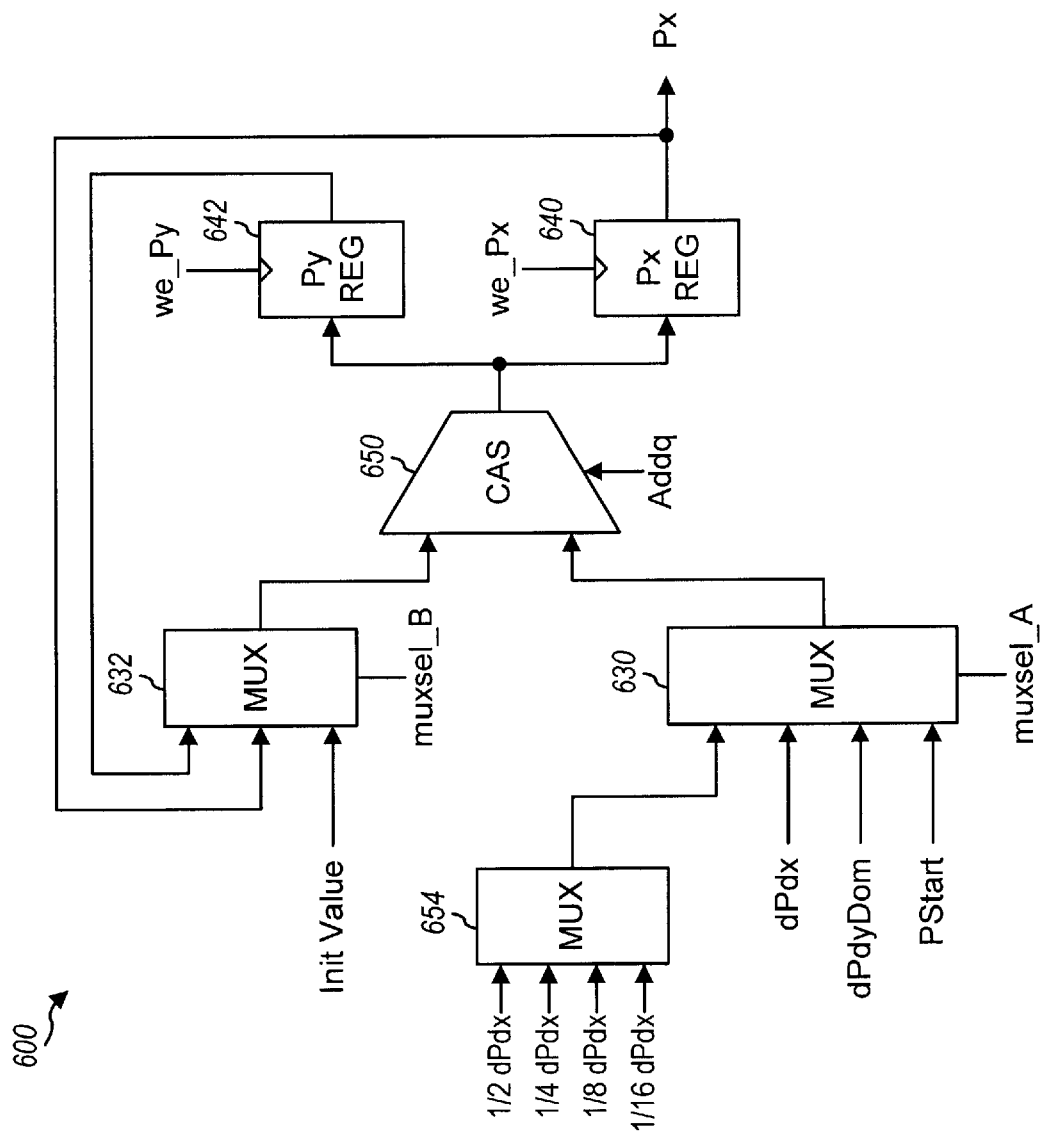
FIG. 6 shows a block diagram of a conventional DDA capable of coarse subpixel correction.

FIG. 6 shows a block diagram of a conventional DDA 600 capable of coarse subpixel correction (i.e., as described in the aforementioned U.S. Pat. No. 5,594,854). The input data registers are not shown in FIG. 6 for simplicity. This architecture includes the disadvantage described above wherein an additional passive message is required for each scan line for a right-to-left scan conversion of each screen-aligned trapezoid.

Figure 7:
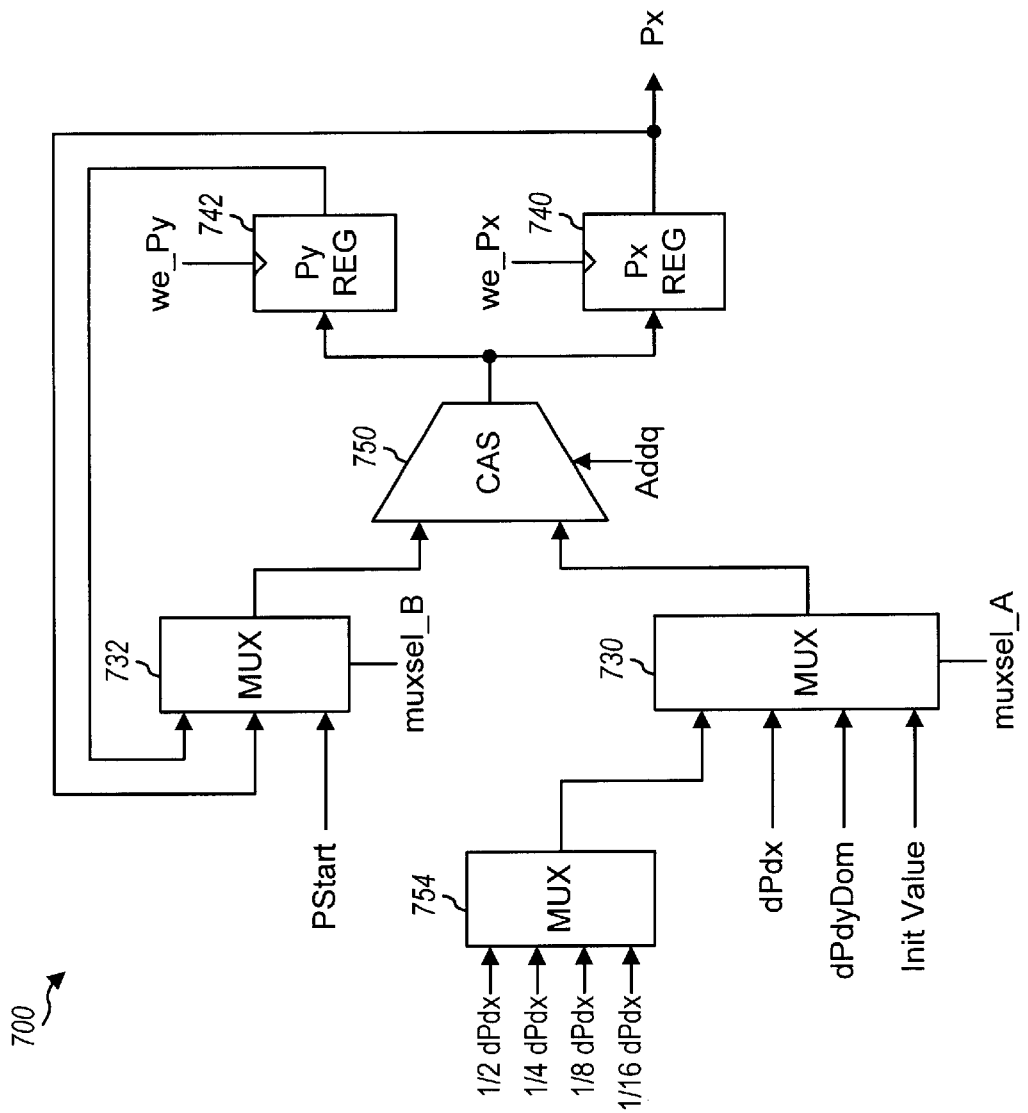
FIG. 7 shows a block diagram of an embodiment of a DDA capable of coarse subpixel correction that avoids a disadvantage associated with the DDA shown in FIG. 6.

FIG. 7 shows a block diagram of an embodiment of a DDA 700 capable of coarse subpixel correction that avoids the above-mentioned disadvantage associated with DDA 600 in FIG. 6. Again, the input data registers are not shown in FIG. 7 for simplicity. In designing DDA 700 to efficiently perform right-to-left scan conversion with parallel setup and render paths, an additional 2-to-1 MlUX is included in the design. The output of the 2-to-1 MUX couples to the dPdx input of MUX 730. The inputs of the 2-to-1 MUX couple to the outputs of the two dPdx input registers (e.g., registers 514 and 520 in FIGS. 5A and 5B).

The improvement is best illustrated by an example implementation. Consider a DDA architecture having the set of instructions listed in Table 4. For a right-to-left scan conversion for a conventional DDA architecture shown in FIG. 6, the sequence of messages provided to DDA 600 and the contents of Px register 640 and Py register 642 after execution of the instruction are listed in Table 5.

TABLE 4

| Instruction | Description |
|---|---|
| PTR | Prepare to render a primitive. |
| PTRRL | Prepare to render a primitive from dominant edge on the right to subordinate edges on the left. |
| PSxM, N | PassiveStepX for the pixel located on the M-th scan line at the N-th pixel location from left to right on this scan line. |
| ASxM, N | ActiveStepX for the pixel located on the M-th scan line at the N-th pixel location from left to right on this scan line. |
| PSyM, N | PassiveStepYDomEdge for the pixel located on the M-th scan line at the N-th pixel location from left to right on this scan line. |
| ASyM, N | ActiveStepYDomEdge for the pixel located on the M-th scan line at the N-th pixel location from left to right on this scan line. |
| SPCM | Subpixel correction for the M-th scan line. |

TABLE 5

| Instruction Sequence | Px register | Py register |
|---|---|---|
| PTR | PStart | PStart |
| ... | ... | ... |
| ASxM − 1, 2 | PStart + (M − 2) · dPdyDom + N · dPdx | PStart + (M − 2) · dPdyDom |
| ASyM − 1, 1 | PStart + (M − 1) · dPdyDom | PStart + (M − 1) · dPdyDom |
| PSxM, N + 1 | PStart + (M − 1) · dPdyDom + dPdx | PStart + (M − 1) · dPdyDom |
| ASxM, N | PStart + (M − 1) · dPdyDom + 2 · dPdx | PStart + (M − 1) · dPdyDom |
| ASxM, N − 1 | PStart + (M − 1) · dPdyDom + 3 · dPdx | PStart + (M − 1) · dPdyDom |
| ... | ... | ... |

Using the DDA architecture shown in FIG. 7, for right-to-left scan conversion, the rasterizer generates the PTRRL message instead of the PTR message upon decoding the Render message from the primitive setup processor. The rasterizer is able to do this correctly based on its own information. Upon receiving the PTRRL message, DDA 700 performs the following computations:

$$Px = PStart + dPdx$$

$$Py = PStart + dPdx. \qquad \text{Eq.(12)}$$

Thus, for a right-to-left scan conversion for the DDA architecture of the invention, the sequence of instructions provided to DDA 700 and the contents of Px register 740 and Py register 742 after execution of the instruction are listed in Table 6.

left or vice versa. This embodiment obviates the need for the additional PTRRL message.

DDA 700 provides the following advantages:

1. DDA 700 is backward compatible with the conventional DDA architecture shown in FIG. 6. DDA 700 executes the PTR, ASx, ASy, PSx, PSy and SPC messages similar to a conventional DDA.
2. DDA 700 functions properly with a conventional rasterizer (i.e., described in the aforementioned U.S. Pat. No. 5,594,854).
3. The complexity of the DDA datapath of DDA 700 is the same as that of a conventional DDA. No additional arithmetic logic, multiplexer, or register is required.
4. DDA 700 performs an adjustment to the PStart value upon receiving the PTRRL message. There is no clock penalty for adding the dPdx value to the PStart value for the initial contents of the Px and Py registers.

TABLE 6

| Instruction Sequence | Px register | Py register |
| --- | --- | --- |
| PTRRL | PStart + dPdx | PStart + dPdx |
| ... | ... | ... |
| ASxM − 1, 2 | PStart + (M − 2) · dPdyDom + N · dPdx | PStart + (M − 2) · dPdyDom + dPdx |
| ASyM − 1, 1 | PStart + (M − 1) · dPdyDom + dPdx | PStart + (M − 1) · dPdyDom + dPdx |
| ASxM, N | PStart + (M − 1) · dPdyDom + 2 · dPdx | PStart + (M − 1) · dPdyDom + dPdx |
| ASxM, N − 1 | PStart + (M − 1) · dPdyDom + 3 · dPdx | PStart + (M − 1) · dPdyDom + dPdx |
| ... | ... | ... |

Thus, in conjunction with DDA 700, the rasterizer generates the sequence of messages shown in Table 6. There is no need to generate a PSxM,N+1 message for the M-th scan line, as would be needed for DDA 600. Therefore, one less step X message is needed for each scan line, which results in a saving of one clock period per scan line.

For a left-to-right scan conversion, the rasterizer generates a PTR message upon receiving the Render message. On receiving the PTR message, the DDA performs the following computation (as before):

$$Px = PStart$$

$$Py = PStart. \qquad \text{Eq.(13)}$$

5. Because the adjustment is performed "in parallel" by all DDAs 700 in the processor, this adjustment is independent of the number of interpolated P parameters in the 3D rendering pipeline.
6. Subpixel correction is dependent only on the scan line and not on the pixel addressed in that scan line. Therefore, no additional adjustment is needed for subpixel correction.

For left-to-right scan conversion, the sequence of messages provided to DDA 600 and the contents of Px register 640 and Py register 642 after execution of the instruction are listed in Table 7.

TABLE 7

| Instruction Sequence | Px register | Py register |
| --- | --- | --- |
| PTR | PStart | PStart |
| ... | ... | ... |
| ASxM, 1 | PStart + (M − 1) · dPdyDom + dPdx | PStart + (M − 1) · dPdyDom |
| ASxM, 2 | PStart + (M − 1) · dPdyDom + 2*dPdx | PStart + (M − 1) · dPdyDom |
| ... | ... | ... |
| ASxM, N − 1 | PStart + (M − 1) · dPdyDom + (N − 1) · dPdx | PStart + (M − 1) · dPdyDom |
| ASxM, N | PStart + (M − 1) · dPdyDom + N · dPdx | PStart + (M − 1) · dPdyDom |
| PSyM, N + 1 | PStart + M · dPdyDom | PStart + M · dPdyDom |
| ... | ... | ... |

In an embodiment, the PTRRL message can be implemented using the conventional PTR ("PrepareToRender") message in conjunction with a bit in a corresponding data field to indicate whether the scan conversion is from right to left or vice versa. This embodiment obviates the need for the For left-to-right scan conversion for the DDA architecture of the invention, the sequence of messages provided to DDA 700 and the contents of Px register 740 and Py register 742 after execution of the messages are listed in Table 8.

TABLE 8

| Instruction Sequence | Px register | Py register |
|---|---|---|
| PTR | PStart | PStart |
| ... | ... | ... |
| ASxM, 1 | PStart + (M − 1) · dPdyDom + dPdx | PStart + (M − 1) · dPdyDom |
| ASxM, 2 | PStart + (M − 1) · dPdyDom + 2 · dPdx | PStart + (M − 1) · dPdyDom |
| ... | ... | ... |
| ASxM, N − 1 | PStart + (M − 1) · dPdyDom + (N − 1) · dPdx | PStart + (M − 1) · dPdyDom |
| ASyM, N | PStart + M · dPdyDom | PStart + M · dPdyDom |
| ... | ... | ... |

As shown in Table 7 and Table 8, a modified (and efficient) rasterizer generates the single ASyM,N message instead of a two-message sequence ASxM,N and PSYM,N+1. Therefore, one less step X message is needed for each scan line, which results in a saving of one clock period per scan line.

Efficient Subpixel Correction

At the start of a new scan line, if the parameters do not coincide with the center of the pixel and these parameters are not adjusted, then the sample point has been effectively offset from the desired position. The computation for subpixel correction is defined by equation 11. Subpixel resolution can be obtained by performing fractional addition or subtraction of one or more partial products. For example, to obtain a corrected value of P that is currently ¾ dPdx units away horizontally from the center of the pixel, the partial products of ½ dPdx and ¼ dPdx is either summed with or subtracted from, depending on the direction of the offset, the current value of Px. The partial products can be generated by performing an arithmetic right shift (or sign-extending and discarding the least significant bits (LSBs) of) the dPdx value. The right shift can be implemented by signal rearrangement of the dPdx value from register 520, and does not require additional logic circuit. The use of fractional arithmetic to obtain subpixel resolution is further described in the aforementioned U.S. Pat. No. 5,594,854.

A relatively coarse resolution used for subpixel correction simplifies the design of DDA 500 by eliminating the need for a multiplier. However, since each fractional arithmetic operation is performed serially, the render time is increased in proportion to the number of partial products to be added or subtracted for the required subpixel correction. For example, to obtain 1/16 dPdx resolution, up to four additional arithmetic operations are performed.

For subpixel correction, one clock cycle is generally required for each bit of resolution in the error magnitude. For the embodiments shown in FIGS. 5A and 5B wherein four bits of resolution is provided, up to four clock cycles per scan line is needed for subpixel correction.

Table 9 lists two embodiments for performing subpixel correction. The unit shown in Table 9 are in 1/16 dPdx. The first embodiment performs subpixel correction using fractional dPdx values (e.g., 1/16, 1/8, 1/4, and 1/2). For each error value, the operation and the number of required clock cycles are listed in columns 2 and 3, respectively. For this embodiment, up to four additional clock cycles are required for subpixel correction. The mean number of clock cycles to complete a subpixel correction is 2.0 clock cycles.

The second embodiment performs subpixel correction using fractional and full dPdx values (e.g., 1/16, 1/8, 1/4, 1/2, and 1). For each error value, the operation and the number of required clock cycles are listed in columns 4 and 5, respectively. For this embodiment, up to three additional clock cycles are required for subpixel correction. The mean number of clock cycles to complete a subpixel correction is 1.75 clock cycles. This embodiment represents a 12.5 percent improvement over the first embodiment shown in columns 2 and 3.

TABLE 9

| Subpixel Correction | Operation | No. Clock Cycles | Operation | No. Clock Cycles |
|---|---|---|---|---|
| 0 | 0 | 1 (or 0) | 0 | 1 (or 0) |
| ±1 | ±1 | 1 | ±1 | 1 |
| ±2 | ±2 | 1 | ±2 | 1 |
| ±3 | ±(2 + 1) | 2 | ±(2 + 1) | 2 |
| ±4 | ±4 | 1 | ±4 | 1 |
| ±5 | ±(4 + 1) | 2 | ±(4 + 1) | 2 |
| ±6 | ±(4 + 2) | 2 | ±(4 + 2) | 2 |
| ±7 | ±(4 + 2 + 1) | 3 | ±(8 − 1) | 2 |
| ±8 | ±8 | 1 | ±8 | 1 |
| ±9 | ±(8 + 1) | 2 | ±(8 + 1) | 2 |
| ±10 | ±(8 + 2) | 2 | ±(8 + 2) | 2 |
| ±11 | ±(8 + 2 + 1) | 3 | ±(8 + 2 + 1) | 3 |
| ±12 | ±(8 + 4) | 2 | ±(8 + 4) | 2 |
| ±13 | ±(8 + 4 + 1) | 3 | ±(8 + 4 + 1) | 3 |
| ±14 | ±(8 + 4 + 2) | 3 | ±(16 − 2) | 2 |
| ±15 | ±(8 + 4 + 2 + 1) | 4 | ±(16 − 1) | 2 |

Multiple Fragments DDA Architecture

A conventional DDA processes one fragment at any given moment and typically does not begin processing of the next fragment until the current fragment is completed. An aspect of the invention described above enables processing of the next primitive (i.e., through the use of parallel setup and render paths) while the current primitive is still being processed. To further improve the throughput rate, another aspect of the invention provides a DDA architecture that facilitates concurrent processing of two or more fragments.

To process two fragments at a given pipelined stage per clock period for a given scan line, the fragments are grouped into pairs, labeled as fragment #0 and fragment #1. Fragment #0 is the first fragment from the dominant edge and fragment #1 is the second fragment from the dominant edge. In the next DDA computation, fragment #0 is the third fragment from the dominant edge and fragment #1 is the fourth fragment from the dominant edge. The grouping continues for the remaining fragments. In general, this grouping may be extended to more than two fragments permitting the processing of multiple fragments on a scan line.

Figure 8A:
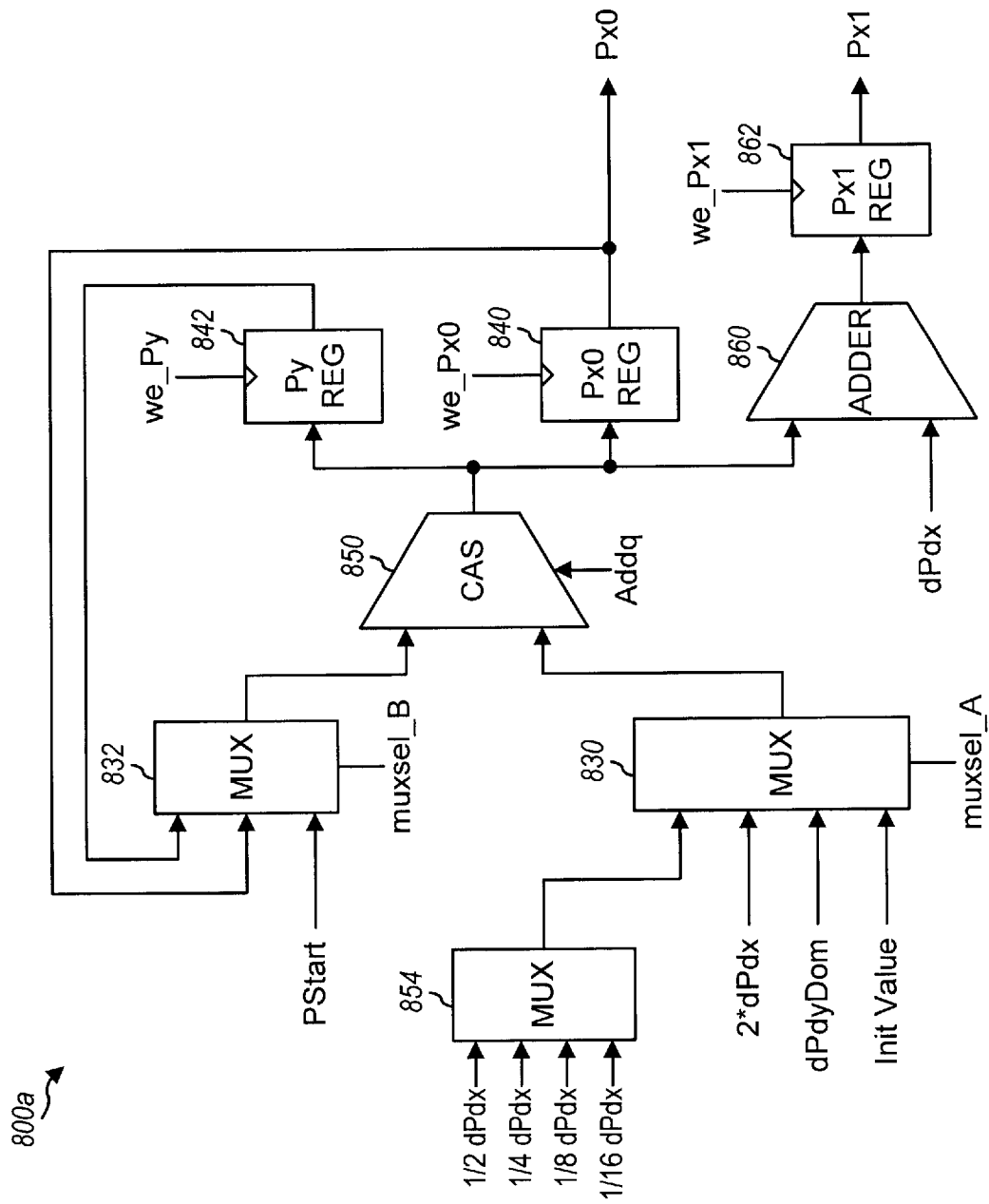
FIGS. 8A–8C shows block diagrams of an embodiment of DDAs of the invention capable of concurrently processing two, three, and four fragments, respectively.

FIG. 8A shows a block diagram of an embodiment of a DDA 800a of the invention capable of concurrently processing two fragments. For simplicity, the input data registers are not shown in FIG. 8A. DDA 800a is similar to DDA 500a in FIG. 5A but includes several modifications and additional elements. First, the dPdx input to MUX 530 in FIG. 5A is substituted by the 2·dPdx input to a corresponding MUX 830 in FIG. 8A. The 2·dPdx input can be obtained by shifting dPdx left by one bit.

In addition, DDA 800a includes an additional adder 860 having one input coupled to the output of a CAS 850. The second input of adder 860 is dPdx. The output of adder 860 couples to a register 862. The output of register 862 is the sum (Px+dPdx) that corresponds to the interpolated value for fragment #1 when Px0 is computed for fragment #0. Registers 840 and 862 are loaded by activating the write enable signals we_Px1 and we_Px1, respectively, which can be the same as the enable signal we_Px in FIGS. 4 through 7.

Figure 8B:
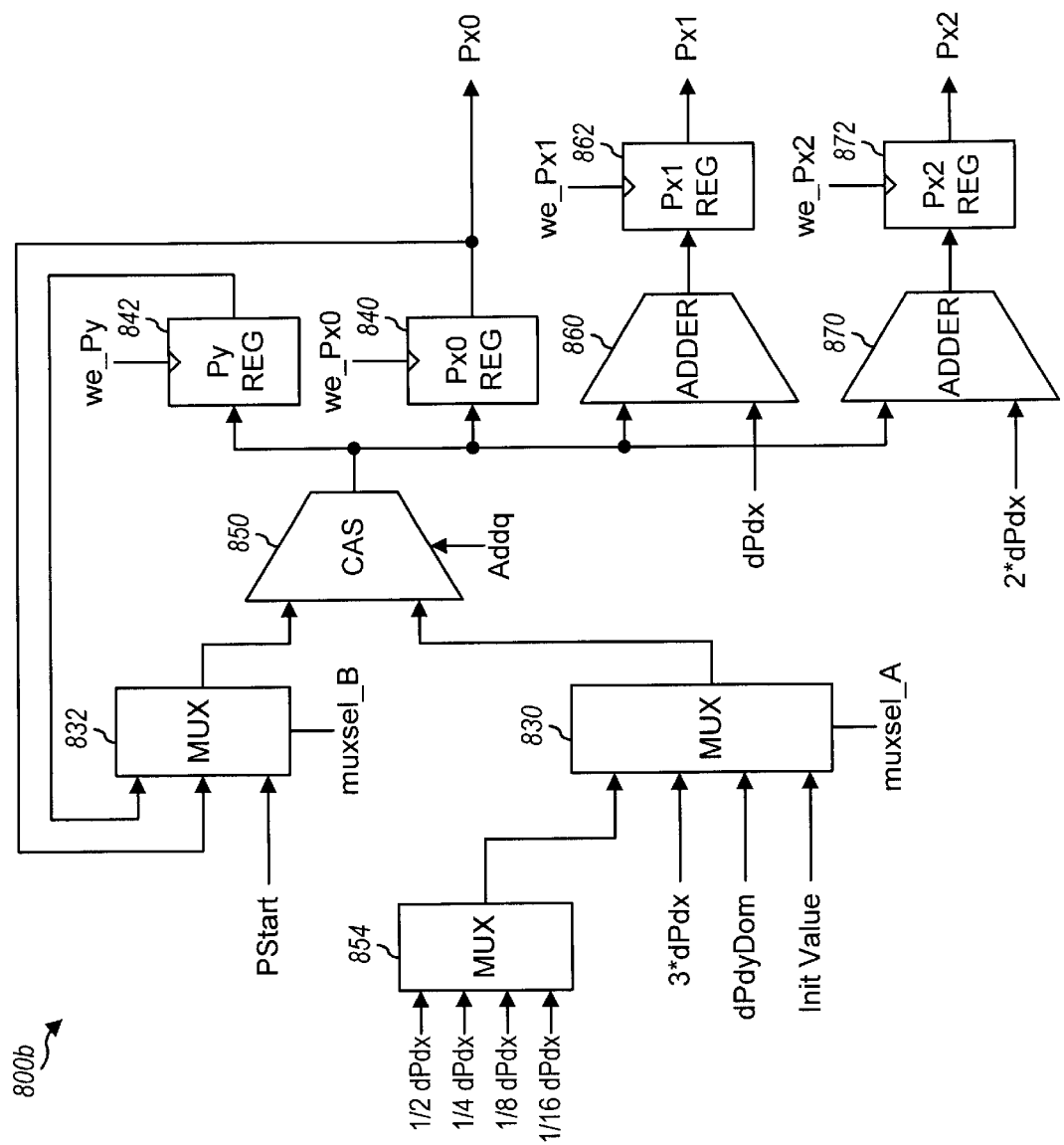

FIG. 8B shows a block diagram of an embodiment of a DDA 800b of the invention capable of concurrently processing three fragments. Generally, the embodiment of FIG. 8A, which is capable of concurrently processing two fragments, can be extended "structurally" to concurrently process more than two fragments. DDA 800b includes the elements of DDA 800a in FIG. 8A. However, the 2•dPdx input to MUX 830 is replaced with an input of 3•dPdx.

DDA 800b further includes an additional adder 870 having one input coupled to the output of CAS 850. The second input of adder 870 is 2•dPdx. The output of adder 870 couples to a register 872, and the output of register 872 (Px2) is the sum (Px+2•dPdx). Px2 corresponds to the interpolated value for fragment #2 when Px0 is computed for fragment #0 and Px1 is computed for fragment #1. Registers 840, 862, and 872 are loaded by activating the write enable signals we_Px0, we_Px1, and we_Px2, respectively, which can be the same as the enable signal we_Px in FIGS. 4 through 7. The value 3•dPdx at the input of MUX 830 is the increment value along the scan line. In general, for a DDA processing N fragments per clock cycle, this value would be N•dPdx. The value 3•dPdx can be generated in various manners known in the art.

Figure 8C:
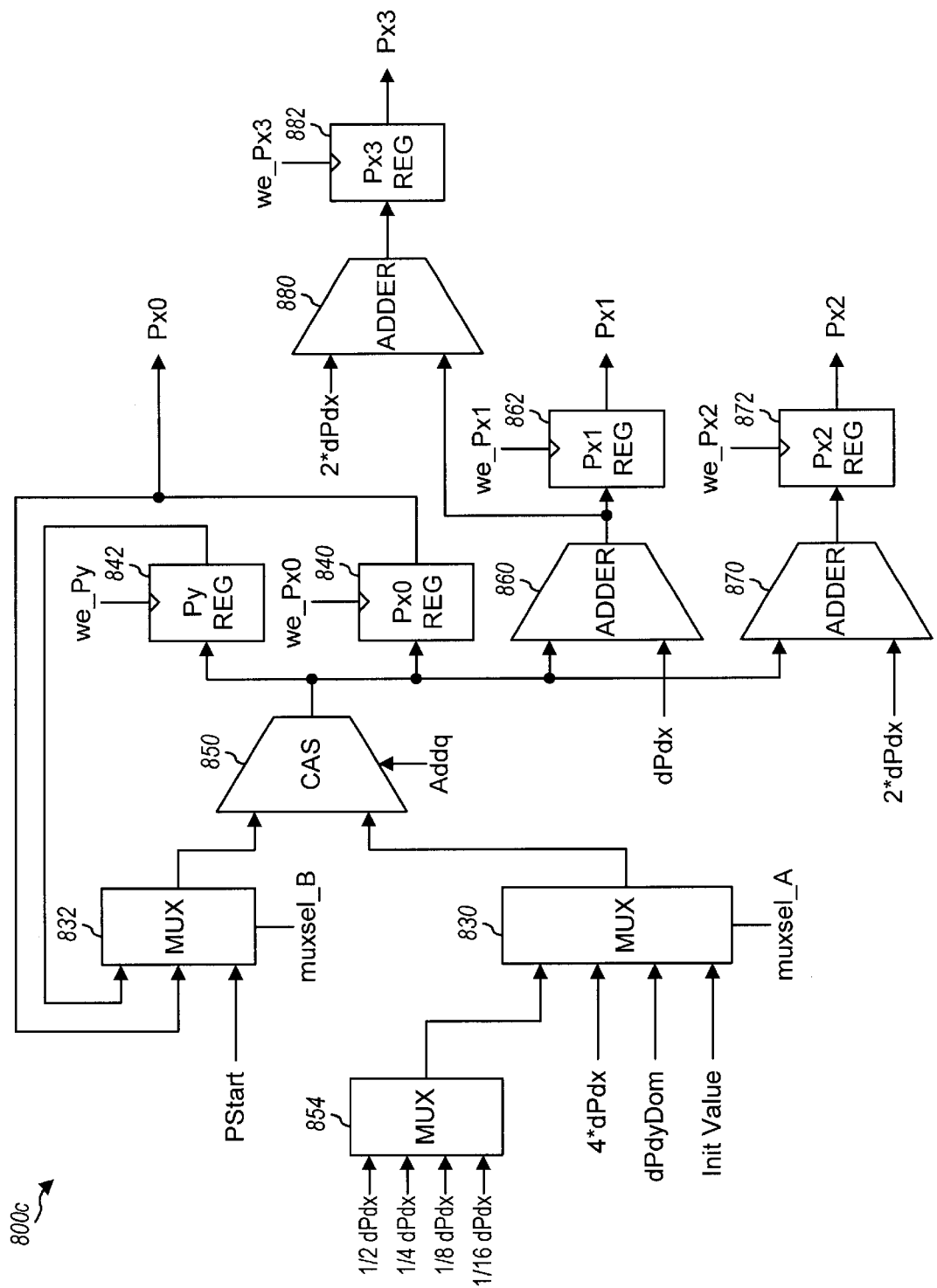

FIG. 8C shows a block diagram of an embodiment of a DDA 800c of the invention capable of concurrently processing four fragments. DDA 800c includes the elements of DDA 800b in FIG. 8B. However, the 3•dPdx input to MUX 830 is replaced with an input of 4•dPdx.

DDA 800c further includes an additional adder 880 having one input coupled to the output of adder 860. This first input receives the value Px+Pdx from adder 860. The second input of adder 880 is 2•dPdx. The output of adder 880 couples to a register 882, and the output of register 882 (Px3) is the sum (Px+3•dPdx). DDA 800c is structured to use dPdx and 2•dPdx (which are easily generated by proper "wiring" of the dPdx value) instead of 3•dPdx (which typically requires additional circuitry). Px3 corresponds to the interpolated value for the fragment #3 when Px0 is computed for fragment #0, Px1 is computed for fragment #1, and Px2 is computed for fragment #2. Registers 840, 862, 872, and 882 are loaded by activating the write enable signals we_Px0, we_Px1, we_Px2, and we_Px3, respectively, which can be the same as the enable signal we_Px in FIGS. 4 through 7. The value 4•dPdx is the increment value along the scan line, and can be obtained by re-wiring of the dPdx data bus.

Referring to FIGS. 8A–8C, adder 860 couples in series with CAS 850 and introduces additional delay in the signal path ending at register 862. This additional delay may limit the frequency of the clock signal used to clock the registers. If this is the case, a register can be interposed between CAS 850 and adder 860 to "isolate" the processing delay of adder 860.

Figure 8D:
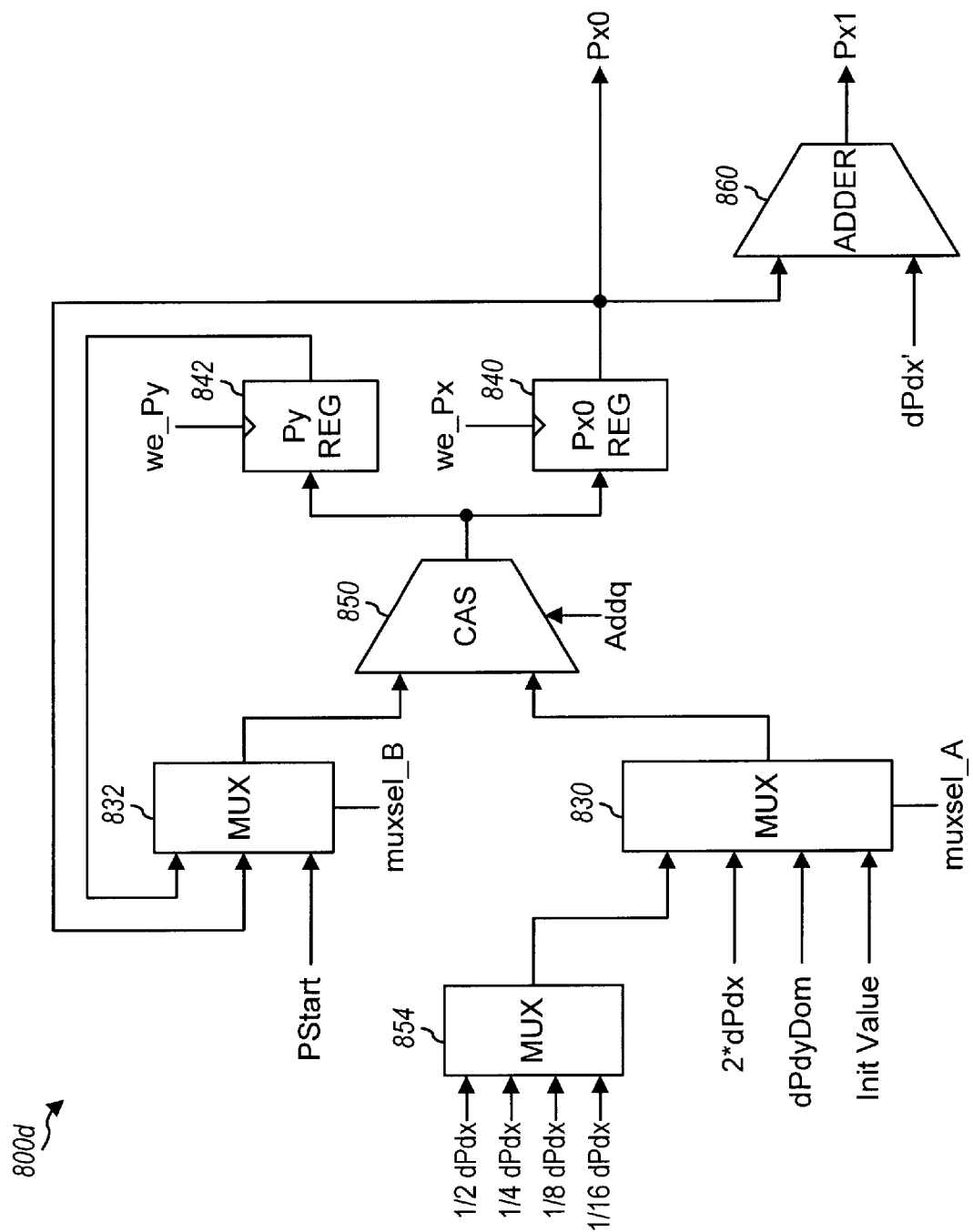
FIG. 8D shows a block diagram of an embodiment of a DDA capable of concurrently processing two fragments and having reduced processing delays.

FIG. 8D shows a block diagram of an embodiment of a DDA 800d capable of concurrently processing two fragments and having reduced processing delays. DDA 800d is similar to DDA 800a shown in FIG. 8A. However, in DDA 800d, one input of adder 860 couples the output of register 840 (as oppose to the output of CAS 850) and the other input of adder 860 receives the value dpdx' (as oppose to the value dpdx). dPdx' an be obtained by delaying dPdx by one "qualified" clock cycle. As used herein, qualified means that dPdx', in the next clock cycle, takes on the value of dPdx if the Px0 register is loaded in the current clock cycle; otherwise dPdx' retains its previous value. Thus, a (dPdx') register is interposed between dPdx and dPdx' and this register is loaded by we_Px signal. This implementation ensures efficient performance while requiring minimal additional hardware. Other methods to maintain the consistency of the equation Px(n+1)=Px(n)+dPdx (see Eq (9)) can also be used and are within the scope of the invention.

Comparing between FIGS. 8A and 8D, register 862 after adder 860 is removed in FIG. 8D. The Px1 output from adder 860 is provided with some delay relative to the Px0 output from register 840.

For processors that require relatively small amount of circuitry to implement its computational function datapath for one fragment (e.g., a stencil or a depth test processor), the function may be duplicated such that two fragments can be processed in parallel per clock cycle. This is especially advantageous for the rendering pipeline, since dual processing of two fragments can potentially convert a pair of active fragments into a pair with at most one active fragment, which can be processed in one clock period by subsequent processors.

For processors that require relatively large amount of circuitry to implement its function for one fragment (e.g., a texture address generation processor), the function may be shared between fragments. For a case in which fragments #0 and #1 are both active, these fragments can be serialized such that fragment #0 is pipelined first, then fragment #1 is pipelined next, and so on. For this case, two clock cycles are used to process two fragments. However, for the other cases (i.e., an active fragment #0 and a passive fragment #1, a passive fragment #0 and an active fragment #1, or a passive fragment #0 and a passive fragment #1), two fragments can be processed per clock cycle. To improve efficiency, the fragments can be distributed to minimize the case when both fragments #0 and #1 are active.

For processors that include DDA 800a, a 2-to-1 multiplexer can be provided downstream from the DDA to select between fragment #0 or fragment #1 such that the results are temporally correct for processing by a single computational function datapath.

Table 10 lists an example set of instructions that can be used to direct operation of a processor that includes one or more DDA 800. Table 10 includes instructions for a DDA capable of concurrently processing two fragments. Table 10 can be updated to include instructions for a DDA capable of concurrently processing three or more fragments.

TABLE 10

| Render Instructions | Description |
| --- | --- |
| PreparetoRender | Prepare to render a primitive. |
| PSxPSx | PassiveStepX for fragment #0, PassiveStepX for fragment #1. |
| PSxASx | PassiveStepX for fragment #0, ActiveStepX for fragment #1. |
| ASxPSx | ActiveStepX for fragment #0, PassiveStepX for fragment #1. |
| ASxASx | ActiveStepX for fragment #0, ActiveStepX for fragment #1. |

TABLE 10-continued

| Render Instructions | Description |
| --- | --- |
| PSx | PassiveStepX for fragment #0. |
| ASx | ActiveStepX for fragment #0. |
| PSy | PassiveStepYDomEdge for fragment #0. |
| ASy | ActiveStepYDomEdge for fragment #0. |
| PSxPSy | PassiveStepX for fragment #0, PassiveStepXDomEdge for fragment #1. |
| PSxPSy | PassiveStepX for fragment #0, ActiveStepXDomEdge for fragment #1. |
| ASxPSy | ActiveStepX for fragment #0, PassiveStepXDomEdge for fragment #1. |
| ASxASy | ActiveStepX for fragment #0, ActiveStepXDomEdge for fragment #1. |
| SPC | Subpixel correction |

Rasterizer Operation

As use herein, a rasterizer can be a graphics subsystem or a module that functions to partition an input sequence into a number of sequences of messages for subsequent processors. Rasterizer 212 internally contains an embodiment of DDAs that may be dissimilar structurally to the DDAs of the invention. For rasterizer 212, a primitive can be two sub-triangles, and not the usual "graphical primitive" such as a triangle, that is processed by the DDAs (i.e., of color shading processor 214). In one embodiment, rasterizer 212 incrementally interpolates along a dominant edge, a subordinate edge, and a span (e.g., a scan line). Therefore, a DDA structure typically exists within rasterizer 212, Table 11 shows the input message stream to rasterizer 212. Rasterizer 212 has two setup phases. For example, setup 1 ras #N sets up the rasterizer for the first sub-triangle for triangle #N; setup 2 ras #N sets up the rasterizer for the second sub-triangle for triangle #N. Setup non-ras #N sets up subsequent processors for the triangle #N. Table 11 is analogous to Table 1 shown above for another processor.

TABLE 11

| Operation (Input Message Stream to the Rasterizer) |
| --- |
| setup 2 ras # N − 1 |
| continue-render # N − 1 |
| setup 1 ras #N |
| setup non-ras #N |
| begin-render #N |
| setup 2 ras #N |
| continue-render #N |
| setup 1 ras # N + 1 |
| setup non-ras # N + 1 |

Table 12 shows the sequence of operations of Table 11 using parallel setup and render paths. As shown in Table 12, the symbol @ indicates where synchronization of the two paths occurs. The begin-render and continue-render messages are the "synchronization" messages for rasterizer 212. As an example, the begin-render corresponds to "Render( )" and the continue-render corresponds to "ContinueNewSub( )" of the aforementioned U.S. Pat. No. 5,594,854.

TABLE 12

| Input Setup Path (of the Rasterizer) | Output Render Path (of the Rasterizer) |
| --- | --- |
| begin-render # N − 1 | @ prepare-to-render # N − 1 |
| setup 2 ras # N − 1 | render 1 # N − 1 |

TABLE 12-continued

| Input Setup Path (of the Rasterizer) | Output Render Path (of the Rasterizer) |
| --- | --- |
| continue-render # N − 1 | @ |
| setup 1 ras # N | render 2 # N − 1 |
| setup non-ras # N | |
| begin-render # N | @ prepare-to-render # N |
| setup 2 ras #N | render 1 #N |
| continue-render # N | @ |
| setup 1 ras # N + 1 | render 2 # N |
| setup non-ras # N + 1 | |
| begin-render # N + 1 | @ prepare-to-render # N + 1 |

Table 13 shows a typical setup message stream output from rasterizer 212 that are then provided to subsequent DDAs (i.e., such as the DDA within color shading processor 214).

TABLE 13

| Output Setup Path (of the Rasterizer) |
| --- |
| setup non-ras # N − 1 |
| prepare-to-render # N − 1 |
| setup non-ras # N |
| prepare-to-render # N |
| setup non-ras # N + 1 |
| prepare-to-render # N + 1 |

Description of Setup and Render Message Streams

A description of the invention using a behavior code (e.g., pseudo C language) is described below. A rasterizer (e.g., rasterizer 212) decomposes a given primitive (e.g., a triangle) into a series of fragments for processing by the remaining downstream graphics pipeline. To draw the triangle, the registers are set up as described below. Sending a "Render" message causes the first half of the triangle to be drawn. After the "Render" message has been issued, the registers in the rasterizer can be altered to draw the second half of the triangle. Only two registers are loaded in the rasterizer before a "ContinueNewSub" message can be sent. Once the rasterizer receives and accepts the "ContinueNewSub" message, it begins drawing this sub-triangle.

As an example, consider a triangle with vertices labeled 1, 2 and 3. Using the terminology of the aforementioned U.S. Pat. No. 5,594,854, assume that edge 13 (from vertices 1 to 3) is the dominant edge and edges 12 and 23 are subordinate edges. Consider vertex 1 to be the start vertex for the scan conversion. Consider the dominant edge to be on the left. The rasterizer scan converts from the dominant edge to the subordinate edges (i.e., left-to-right scan conversion in this example).

For drawing this particular example triangle, all the bit fields within the render data associated with the "Render" message are set to 0, except a "PrimitiveType" which is set to trapezoid and a "SubPixelCorrectionEnable" bit which is set to TRUE. The other fields in the render data can be set to non-zero values, depending on how the triangle is desired to be displayed.

The following is a message stream sequence before the rasterizer. The message stream is a sequence of messages. Each message has a tag (or an instruction) field and a data field. For example, in the representation "Render (data_1)", "Render" is the instruction field and data_1 is the data field. As another example, "dSdyDom (dSdyl$_{13}$)" is a concatenation of the instruction field "dSdyDom" and the data field dSdy$_{13}$ to form a message.

For clarity, the message stream is shown in italic and comments are preceded by a double backslash ("//").

```
// Set the rasterizer mode
    RasterizerMode (mode)
// Set the render mode to aliased primitive with subpixel correction.
// Setup the start values and the gradients.
// Note that the X and Y coordinates are converted to 16.16 format
    StartXDom (X₁)       // X₁ = X₁ << 16
    dXDom (dXDom)        // dXDom = ((X₃-X₁)<<16)/(Y₃-Y₁))
    StartXSub (X₁)       // X₁ = X₁ << 16
    dXSub (dXSub)        // dXSub = ((X₂-X₁)<<16)/(Y₂-Y₁))
    StartY (Y₁)          // Y₁ = Y₁ << 16
    dY (-1)              // Down the screen
    Count (Y₁₂)          // Y₁₂ = abs(Y₁-Y₂)
// Load the start and gradient values for texture address to draw the
triangle
    SStart      (S₁)
    dSdyDom     (dSdy₁₃)    // To walk up the dominant edge
    dSdx        (dSdx)      // To walk along the scan line
    TStart      (T₁)
    dTdyDom     (dTdy₁₃)    // To walk up the dominant edge
    dTdx        (dTdx)      // To walk along the scan line
    QStart      (Q₁)
    dQdyDom     (dQdy₁₃)    // To walk up the dominant edge
    dQdx        (dQdx)      // To walk along the scan line
// Draw first half of the triangle
    Render (render)
// where
// render.PrimitiveType = TRAPEZOID_PRIMITIVE
// render.SubpixelCorrectionEnable = TRUE
// render.AntialiasEnable = DISABLE
// Set the start and gradient for the second half of the triangle
    StartXSub (X₂)       // X₂ = X₂ << 16
    dXSub (dXSub)        // dXSub = ((X₃-X₂)<<16)/(Y₃-Y₂))
// Draw second half of the triangle
    ContinueNewSub (Y₂₃)    // Y₂₃ = abs(Y₂-Y₃)
```

The rasterizer processes this message stream and produces, for example, two message streams—one message stream for the setup path and another message stream for the render path. The message stream from "RasterizerMode (mode)" to "Count (Y₁₂)" and from "StartXSub (X₂)" to "ContinueNewSub (Y₂₃)" are setup messages for the rasterizer and are consumed by the rasterizer. The setup message stream for the setup path from the rasterizer is as follows. The rasterizer substitutes the "PrepareToRender" message for the "Render" message.

```
// Load the start and gradient values for texture address to draw the
triangle
    SStart      (S₁)
    dSdyDom     (dSdy₁₃)    // To walk up the dominant edge
    dSdx        (dSdx)      // To walk along the scan line
    TStart      (T₁)
    dTdyDom     (dTdy₁₃)    // To walk up the dominant edge
    dTdx        (dTdx)      // To walk along the scan line
    QStart      (Q₁)
    dQdyDom     (dQdy₁₃)    // To walk up the dominant edge
    dQdx        (dQdx)      // To walk along the scan line
// Draw first half of the triangle
    PrepareToRender (render)
```

The render message stream for the render path from the rasterizer is as follows. The rasterizer produces a sequence of active (and passive) step messages (e.g., "ActiveStepX", "ActiveStepYDomEdge," and "SubPixelCorrection" messages) as the primitive is scan converted.
// Draw first half of the triangle
    PrepareToRender(render)
// Sequence of ActiveStepX, ActiveStepYDomEdge and SubPixelCorrection messages
    ActiveStepX
    ActiveStepX
    ActiveStepX
    ActiveStepYDomEdge
    SubPixelCorrection
    ActiveStepX
    ActiveStepX
    ActiveStepX
    ActiveStepX
    ActiveStepX
    ActiveStepYDomEdge
    SubPixelCorrection
    ActiveStepX
// the sequence of messages can continue until the entire primitive is scan converted FIG. 3 shows conceptually the partitioning of a processor containing a DDA datapath into a setup path and a render path. The computational function datapath may be non-pipelined, pipelined, or multi-cycled. The number of pipe stages may vary dynamically or quasi-dynamically depending on the modes or the functions the processor is set up to compute.

For example, consider a texture address processor that computes the texture coordinates (S, T) in 2-D (two-dimensional) texture space corresponding to screen pixel coordinates (X, Y) in 2-D screen space. Using homogeneous notation, the texture coordinates (S, T) is represented by the 3-D homogeneous vector (S', T', Q)=(SQ, TQ, Q) where Q is a nonzero number. For a perspective compound mapping, texture coordinates (S, T) can be correctly and incrementally computed by rational linear interpolation—independent interpolation of a linear numerator (S' and T') and a linear denominator (Q), followed by division at each pixel (S'/Q and T'/Q), as follows:

S=S'/Q

T=T'/Q.

Therefore, three DDAs are used, one each to linear interpolate S', T', and Q. The (S, T) can be computed by one of various methods such as: (1) with two dividers in parallel; (2) with one divider sequentially; (3) by a reciprocal followed by two multipliers; or (4) by various other methods (e.g. using look up values in pre-computed tables). These computations may require multiple clock periods to produce (S, T). Pipelining the computational function datapath is one technique to increase the throughput to compute (S, T), with comparable delay by introducing some pipe stages.

Polygons that are viewed with parallel projection and parameterized affinely have an affine compound mapping. The texture mapping can be correctly and incrementally computed by linear interpolating s and t along the sides of a polygon and across each scan line. For an affine compound mapping, as Q=1, the texture address processor computes:

S=S'

T=T'.

Therefore, only two DDAs are used. This latter computation requires no pipe stages.

Specific Implementation of Synchronization Algorithm Described with Behavioral C Pseudo-Code For a processor in the graphics subsystem described in the aforementioned U.S. Pat. No. 5,594,854, the behavioral pseudo-code to control the unified setup and render path can be described as follows.

```
wait for input message
{
    switch (input message decoded)
    {
        case PStart:
        case dPdx:
        case dPdyDom:
            update corresponding register;
            break;
        case PrepareToRender:
            record state from render field of PrepareToRender
                message;
            initialize DDAs from the start registers;
            wait for available space in output FIFO;
            forward the input message to output FIFO;
            break;
        case ActiveStep:
            do Computational Function;
        case PassiveStep:
            step DDAs according to step type;
            wait for available space in output FIFO;
            forward the input message to output FIFO;
            break;
        case SubPixelCorrection:
            do sub-pixel correction;
            wait for available space in output FIFO;
            forward the input message to output FIFO;
            break;
        default:
            wait for available space in output FIFO;
            forward the input message to output FIFO;
            break;
    }
    flush input message from input FIFO;
}
```

The changes for the parallel setup and render paths are described below. At initialization for the parallel setup and render paths, the e-bit and i-bit for a given processor are initialized as follows:

e-bit=0
i-bit=1.

The algorithm for the setup path has been described previously. The behavioral pseudo-code to control the setup path is described below. It can be noted that the controller can write the e-bit but not the i-bit.

```
wait for input message
{
    switch (input message decoded)
    {
        case PStart:
        case dPdx:
        case dPdyDom:
            stall until e_bit != i_bit;
            update corresponding register;
            break;
        case PrepareToRender:
            stall until e_bit != i_bit;
            toggle e_bit;
            wait for available space in SETUP output FIFO;
            forward the input message to SETUP output FIFO;
            break;
        default:
            wait for available space in SETUP output FIFO;
            forward the input message to SETUP output FIFO;
            break;
    }
    flush input message from SETUP input FIFO;
}
```

The algorithm for the render path is described above. The behavioral pseudo-code to control the render path is described below. Note that the controller can write the i-bit but not the e-bit.

```
wait for input message
{
    switch (input message decoded)
    {
        case PrepareToRender:
            stall until e_bit == i_bit;
            record state from render field of
                PrepareToRender message;
            initialize DDAs from the start registers;
            transfer contents of external registers to internal
                registers;
            toggle i_bit;
            wait for available space in RENDER output FIFO;
            forward the input message to RENDER output FIFO;
            break;
        case ActiveStep:
            do Computational Function;
        case PassiveStep:
            step DDAs according to step type;
            wait for available space in RENDER output FIFO;
            forward the input message to RENDER output FIFO;
            break;
        case SubPixelCorrection:
            do sub-pixel correction;
            wait for available space in RENDER output FIFO;
            forward the input message to RENDER output FIFO;
            break;
        default:
            wait for available space in RENDER output FIFO;
            forward the input message to RENDER output FIFO;
            break;
    }
    flush input message from RENDER input FIFO;
}
```

Applications for DDAs

The DDAs of the invention has been described in the context-of a graphics system for simplicity. However, DDA is an element that finds use in many other applications, including non-graphics applications. For example, the DDA has been used in the following applications:

1. A digital computer for guiding the flight of a ballistic missile through instrumentation of a Q Matrix, such as that described in U.S. Pat. No. 4,405,985 issued to Hall, et al.
2. Numerical control of machine tools, such as those described in U.S. Pat. No. 3,693,064 issued to Kiwiet, U.S. Pat. No. 3,757,095 issued to Kiwiet, and U.S. Pat. No. 3,916,175 issued to Lauer, et al.
3. A digital signal processor optimized for synthetic aperture radar (SAR) image formation, such as that described in U.S. Pat. No. 5,329,283 issued to Smith.
4. A spiral sweep generator for a rectangular Cartesian coordinate PPI display in a sonar system, such as that described in U.S. Pat. No. 3,751,712 issued to Murray.
5. Accelerates and decelerates a stepping motor, such as that described in U.S. Pat. No. 3,805,138 issued to Hilker.
6. Printing mechanism of the pattern generation apparatus, such as that described in U.S. Pat. No. 5,533,170 issued to Teitzer, et al.

These various patents are incorporated herein by reference.

Conclusion

The foregoing description of specific embodiments is provided to enable any person skilled in the art to make or use the present invention. The various modifications to these embodiments will be readily apparent to those skilled in the art, and the generic principles defined herein may be applied to other embodiments without the use of the inventive faculty. For example, the DDA of the invention can be implemented within an integrated circuit. The integrated circuit can be incorporated within a circuit card that is then installed on a computer. Thus, the present invention is not intended to be limited to the embodiments shown herein but is to be accorded the widest scope consistent with the principles and novel features disclosed herein, and as defined by the following claims.

What is claimed is:

1. A digital differential analyzer (DDA) comprising:
   at least one input buffer to receive at least one sequence of messages, wherein each message includes an instruction and associated data;
   a setup path, coupled to the at least one input buffer, that operates on one primitive of an object; and
   a render path, coupled to the at least one input buffer in parallel with the setup path, that operates on another primitive, the render path including an arithmetic unit;
   wherein the setup path and the render path are capable of executing multiple instructions substantially concurrently.

2. The DDA of claim 1 wherein at least one of the setup path and render path are pipelined.

3. The DDA of claim 1 wherein each message in the sequence is a setup message, a synchronization message, or a render message.

4. The DDA of claim 1 wherein each DDA includes a double buffer that stores data values for primitives of an object.

5. An integrated circuit that includes the DDA of claim 1.

6. A processor that includes the DDA of claim 1.

7. A digital differential analyzer (DDA) comprising:
   at least one input buffer to receive input data values associated with an object;
   at least one output buffer to store calculated output data values;
   an arithmetic unit operatively coupled to the at least one input buffer and the at least one output buffer, wherein the arithmetic unit computes the calculated output data values based on selected ones of values from the at least one input buffer and the at least one output buffer,
   wherein the DDA is capable of receiving input data values and calculating output data values substantially concurrently; and
   a clamp unit coupled to the at least one output buffer, wherein the clamp unit maintains the calculated output data values to within a predetermined range.

8. A digital differential analyzer (DDA) comprising:
   a first input buffer to store a start value;
   a first set of input buffers to store a first gradient value, the first set of input buffers including a first external register and a first internal register;
   a first output buffer to store a first output value;
   an arithmetic unit operatively coupled to the first input buffer, the first set of input buffers, and the first output buffer, wherein the arithmetic unit performs arithmetic computation on selected ones of the values from the first input buffer, the first set of input buffers, and the first output buffer, and provides the first output value to the first output buffer; and
   a clamp unit coupled to the first output buffer, wherein the clamp unit maintains the first output value to within a predetermined range.

9. The DDA of claim 8 further comprising:
   a second set of input buffers to store a second gradient value, the second set of input buffers including a second external register and a second internal register; and
   a second output buffer for storing an second output value;
   wherein the arithmetic unit further operatively couples to the second set of input buffers and the second output buffer.

10. The DDA of claim 9 further comprising:
    a first multiplexer interposed between the first set of input registers and the arithmetic unit; and
    a second multiplexer interposed between the second set of input registers and the arithmetic unit.

11. A digital differential analyzer (DDA) comprising:
    a first multiplexer that receives a starting value for the parameter P;
    a second multiplexer that receives a set of gradient values for a parameter P;
    a third multiplexer coupled to either the first or second multiplexer, the third multiplexer provides a set of fractional gradient values;
    a first arithmetic unit coupled to the first and second multiplexers;
    a first register coupled to the first arithmetic unit to store a first result from the first arithmetic unit; and
    a second register coupled to the first arithmetic unit to store a second result from the first arithmetic unit,
    wherein the first multiplexer further couples to the first and second registers.

12. The DDA of claim 11 wherein the set of gradient values includes a gradient value along a scan line and a gradient value along a dominant edge of a primitive.

13. The DDA of claim 11 further comprising:
    a second arithmetic unit operatively coupled to the first arithmetic unit.

14. The DDA of claim 13 wherein the second arithmetic unit further receives a gradient value for the parameter P.

15. A subsystem comprising:
    a rasterizer that generates a first sequence of messages including setup messages and synchronization messages, and generates a second sequence of messages including render messages and synchronization messages; and
    at least one digital differential analyzer (DDA) coupled to the rasterizer to receive the at least one sequence of messages, wherein each DDA includes a setup processing path for executing the first sequence of messages and a render processing path for executing the second sequence of messages, the setup processing path and the render processing path capable of executing multiple message substantially concurrently.

16. The subsystem of claim 15 wherein each DDA includes a plurality of buffers that store data values for a plurality of primitives of an image.

17. The subsystem of claim 16 wherein each DDA includes a double buffer that stores data values for successive primitives of an image.

18. A subsystem comprising:
    a rasterizer that generates a plurality of sequences of messages, wherein each message is a setup message, a synchronization message, or a render message; and
    at least one digital differential analyzer (DDA) coupled to the rasterizer to receive the plurality of sequences of messages, each DDA including at least one input buffer to receive input data values associated with an object, at least one output buffer to store calculated output data values, and an arithmetic unit operatively coupled to the at least one input buffer and the at least one output buffer, wherein the arithmetic unit provides the calculated output data values based on selected ones of the values from the at least one input buffer and the at least one output buffer, wherein the DDA is capable of receiving input data values and calculating output data values substantially concurrently.

19. A method for rendering an object comprising:

receiving a high level description of the object;

transforming the high level description into at least one sequence of messages;

receiving setup information for a particular primitive of the object; and rendering another particular primitive;

wherein the receiving setup information and the rendering are performed substantially concurrently within one DDA.

20. The method of claim 19 wherein the receiving setup information and the rendering are performed for different primitives of the object.

21. The method of claim 19 wherein the rendering comprises:

receiving a current output value and a gradient value; and computing a new output value based on the current output value and the gradient value.

22. A computer program product for rendering an object comprising:

code for receiving a high level description of the object;

code for transforming the high level description into at least one sequence of messages;

code for receiving setup information for a particular primitive of the object;

code for rendering another particular primitive; and a computer-readable storage medium for storing the codes;

wherein the codes for receiving setup information and the code for rendering are executed substantially concurrently within one DDA.

23. The product of claim 22 wherein the code for rendering comprises:

code for receiving a current output value and a gradient value; and code for computing a new output value based on the current output value and the gradient value.

* * * * *